US008725064B2

(12) United States Patent
Anderson, Jr. et al.

(10) Patent No.: US 8,725,064 B2
(45) Date of Patent: *May 13, 2014

(54) SYSTEM AND METHOD FOR PROVIDING EVENT SPECTATORS WITH AUDIO/VIDEO SIGNALS PERTAINING TO REMOTE EVENTS

(75) Inventors: Tazwell L. Anderson, Jr., Atlanta, GA (US); Geoffrey L. Anderson, Atlanta, GA (US); Mark A Wood, Boca Raton, FL (US); Robert J Kniskern, Fort Wayne, IN (US); Todd H Steele, Fort Wayne, IN (US)

(73) Assignee: Immersion Entertainment, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,013

(22) Filed: Mar. 30, 2011

(65) Prior Publication Data
US 2011/0179440 A1 Jul. 21, 2011

Related U.S. Application Data

(63) Continuation of application No. 12/557,725, filed on Sep. 11, 2009, now Pat. No. 7,929,903, and a continuation of application No. 11/070,353, filed on Mar. 2, 2005, now Pat. No. 7,593,687, which is a continuation-in-part of application No. 10/680,612, filed on Oct. 7, 2003, now Pat. No. 7,725,073.

(51) Int. Cl.
*H04H 40/00* (2008.01)
*H04H 20/71* (2008.01)
*H04M 1/00* (2006.01)
*H04B 1/38* (2006.01)

(52) U.S. Cl.
USPC ......... 455/3.06; 455/3.03; 455/145; 455/566; 455/567; 455/556.1; 455/557

(58) Field of Classification Search
USPC ............ 455/3.06, 3.03, 145, 566, 567, 556.1, 455/557
See application file for complete search history.

(56) References Cited

U.S. PATENT DOCUMENTS 1,527,802 A 2/1925 Huggins
1,648,832 A 11/1927 Urban
(Continued)

FOREIGN PATENT DOCUMENTS

CA 2237939 9/1999
EP 0 782 365 A2 2/1997
(Continued)

OTHER PUBLICATIONS

Ron Glover; "Armchair Baseball From the Web—Or Your Stadium Seat"; copyright 1998; The McGraw-Hill Companies, Inc.; 2 pgs.
(Continued)

*Primary Examiner* — Bobbak Safaipour
(74) *Attorney, Agent, or Firm* — Dean Small; The Small Patent Law Group LLC

(57) ABSTRACT

A system and method for providing content for access by a portable device at an event are provided. The system includes an interface to receive signals from a plurality of sources. The plurality of sources are located at an event and remote from the event. The signals define event content and non-event content. The system further includes a processor for processing the received signals to generate combined signals based upon the received signals from the plurality of sources. The system also includes a transmitter for transmitting to a plurality of portable devices at the event the combined signals. The combined signals are configured to allow a user to select content using the portable device receiving the combined signals.

64 Claims, 9 Drawing Sheets

(56) References Cited

U.S. PATENT DOCUMENTS

| | | | |
|---|---|---|---|
| 2,603,724 A | 7/1952 | Kettler | |
| 2,856,469 A | 10/1958 | Morse | |
| 2,946,860 A | 7/1960 | Jansen et al. | |
| 4,472,830 A | 9/1984 | Nagai | |
| 4,479,150 A | 10/1984 | Ilmer et al. | |
| 4,486,897 A | 12/1984 | Nagai | |
| 4,504,861 A | 3/1985 | Dougherty | |
| 4,572,323 A | 2/1986 | Randall | |
| 4,580,174 A | 4/1986 | Tokunaka | |
| 4,605,950 A | 8/1986 | Goldberg et al. | |
| 4,615,050 A | 10/1986 | Lonnstedt | |
| 4,620,068 A | 10/1986 | Wieder | |
| 4,665,438 A | 5/1987 | Miron et al. | |
| 4,727,585 A | 2/1988 | Flygstad | |
| 4,764,817 A | 8/1988 | Blazek et al. | |
| 4,791,477 A | 12/1988 | Blazek et al. | |
| 4,802,243 A | 2/1989 | Griffiths | |
| 4,809,079 A | 2/1989 | Blazek et al. | |
| 4,830,138 A | 5/1989 | Palmaer et al. | |
| 4,853,764 A | 8/1989 | Sutter | |
| 4,855,827 A | 8/1989 | Best | |
| 4,856,089 A | 8/1989 | Horton | |
| 4,856,118 A | 8/1989 | Sapiejewski | |
| 4,864,425 A | 9/1989 | Blazek et al. | |
| 4,866,515 A | 9/1989 | Tagawa et al. | |
| 4,887,152 A | 12/1989 | Matsuzaki et al. | |
| 4,944,361 A | 7/1990 | Lindgren et al. | |
| 4,958,697 A | 9/1990 | Moody | |
| 4,965,825 A | 10/1990 | Harvey et al. | |
| 4,982,278 A | 1/1991 | Dahl et al. | |
| 4,983,967 A | 1/1991 | McKenzie | |
| 5,018,599 A | 5/1991 | Dohi et al. | |
| 5,020,163 A | 6/1991 | Aileo et al. | |
| 5,023,707 A | 6/1991 | Briggs | |
| 5,023,955 A | 6/1991 | Murphy, II et al. | |
| 5,046,192 A | 9/1991 | Ryder | |
| 5,068,923 A | 12/1991 | Sjoqvist | |
| 5,105,183 A | 4/1992 | Beckman | |
| 5,109,414 A | 4/1992 | Harvey et al. | |
| 5,119,442 A | 6/1992 | Brown | |
| 5,128,765 A | 7/1992 | Dingwall et al. | |
| 5,133,081 A | 7/1992 | Mayo | |
| 5,138,440 A | 8/1992 | Radice | |
| 5,138,722 A | 8/1992 | Urella et al. | |
| 5,161,250 A | 11/1992 | Ianna et al. | |
| 5,173,721 A | 12/1992 | Green | |
| 5,179,736 A | 1/1993 | Scanlon | |
| 5,185,807 A | 2/1993 | Bergin et al. | |
| 5,189,630 A | 2/1993 | Barstow et al. | |
| 5,237,648 A | 8/1993 | Mills et al. | |
| 5,243,415 A | 9/1993 | Vance | |
| 5,252,069 A | 10/1993 | Lamb et al. | |
| 5,289,272 A | 2/1994 | Rabowsky et al. | |
| 5,289,288 A | 2/1994 | Silverman et al. | |
| 5,297,037 A | 3/1994 | Ifuku | |
| 5,321,416 A | 6/1994 | Bassett et al. | |
| 5,359,463 A | 10/1994 | Shirochi et al. | |
| 5,392,158 A | 2/1995 | Tosaki | |
| 5,408,686 A * | 4/1995 | Mankovitz | 455/66.1 |
| 5,414,544 A | 5/1995 | Aoyagi et al. | |
| 5,420,381 A | 5/1995 | Gardner, Jr. et al. | |
| 5,440,197 A | 8/1995 | Gleckman | |
| 5,448,291 A | 9/1995 | Wickline | |
| 5,463,428 A | 10/1995 | Lipton et al. | |
| 5,481,478 A | 1/1996 | Palmieri et al. | |
| 5,485,504 A | 1/1996 | Ohnsorge | |
| 5,506,705 A | 4/1996 | Yamamoto et al. | |
| 5,510,828 A * | 4/1996 | Lutterbach et al. | 725/138 |
| 5,513,384 A * | 4/1996 | Brennan et al. | 455/180.1 |
| 5,524,195 A * | 6/1996 | Clanton et al. | 725/61 |
| 5,546,099 A | 8/1996 | Quint et al. | |
| 5,583,562 A | 12/1996 | Birch et al. | |
| 5,585,850 A | 12/1996 | Schwaller | |
| 5,585,858 A | 12/1996 | Harper et al. | |
| 5,594,551 A | 1/1997 | Monta | |
| 5,598,208 A | 1/1997 | McClintock | |
| 5,600,365 A | 2/1997 | Kondo et al. | |
| 5,600,368 A | 2/1997 | Matthews, III | |
| 5,613,191 A | 3/1997 | Hylton et al. | |
| 5,617,331 A | 4/1997 | Wakai | |
| 5,627,915 A | 5/1997 | Rosser et al. | |
| 5,631,693 A | 5/1997 | Wunderlich et al. | |
| 5,642,221 A | 6/1997 | Fischer et al. | |
| 5,663,717 A | 9/1997 | DeLuca | |
| 5,666,151 A | 9/1997 | Kondo et al. | |
| 5,668,339 A | 9/1997 | Shin | |
| 5,671,320 A | 9/1997 | Cookson et al. | |
| 5,682,172 A | 10/1997 | Travers et al. | |
| 5,696,521 A | 12/1997 | Robinson et al. | |
| 5,708,961 A | 1/1998 | Hylton et al. | |
| 5,712,950 A | 1/1998 | Cookson et al. | |
| 5,719,588 A | 2/1998 | Johnson | |
| 5,729,471 A | 3/1998 | Jain et al. | |
| 5,729,549 A | 3/1998 | Kostreski et al. | |
| 5,742,263 A | 4/1998 | Wang et al. | |
| 5,742,521 A | 4/1998 | Ellenby et al. | |
| 5,754,254 A | 5/1998 | Kobayashi et al. | |
| 5,760,819 A | 6/1998 | Sklar et al. | |
| 5,760,824 A | 6/1998 | Hicks, III | |
| 5,760,848 A | 6/1998 | Cho | |
| 5,767,820 A | 6/1998 | Bassett et al. | |
| 5,793,416 A | 8/1998 | Rostoker et al. | |
| 5,806,005 A | 9/1998 | Hull et al. | |
| 5,808,695 A | 9/1998 | Rosser et al. | |
| 5,809,574 A | 9/1998 | Falco et al. | |
| 5,812,224 A | 9/1998 | Maeda et al. | |
| 5,815,126 A | 9/1998 | Fan et al. | |
| 5,835,609 A | 11/1998 | LeGette et al. | |
| 5,841,122 A | 11/1998 | Kirchhoff | |
| 5,844,656 A | 12/1998 | Ronzani et al. | |
| 5,847,612 A | 12/1998 | Birleson | |
| 5,847,762 A | 12/1998 | Canfield et al. | |
| 5,867,223 A | 2/1999 | Schindler et al. | |
| 5,867,579 A | 2/1999 | Saito | |
| 5,880,773 A | 3/1999 | Suzuki | |
| 5,887,286 A | 3/1999 | Waldron | |
| 5,892,554 A | 4/1999 | DiCicco et al. | |
| 5,894,320 A | 4/1999 | Vancelette | |
| 5,900,849 A | 5/1999 | Gallery | |
| 5,903,395 A | 5/1999 | Rallison et al. | |
| 5,920,827 A | 7/1999 | Baer et al. | |
| 5,946,635 A | 8/1999 | Dominguez | |
| D413,881 S | 9/1999 | Ida et al. | |
| 5,953,076 A | 9/1999 | Astle et al. | |
| 5,982,445 A | 11/1999 | Eyer et al. | |
| 5,986,803 A | 11/1999 | Kelly | |
| 5,990,958 A | 11/1999 | Bheda et al. | |
| 5,999,808 A | 12/1999 | LaDue | |
| 6,002,720 A | 12/1999 | Yurt et al. | |
| 6,002,995 A | 12/1999 | Suzuki et al. | |
| 6,009,336 A | 12/1999 | Harris et al. | |
| 6,016,348 A | 1/2000 | Blatter et al. | |
| 6,020,851 A | 2/2000 | Busack | |
| 6,034,716 A | 3/2000 | Whiting et al. | |
| 6,035,349 A | 3/2000 | Ha et al. | |
| 6,043,837 A | 3/2000 | Driscoll, Jr. et al. | |
| 6,052,239 A | 4/2000 | Matsui et al. | |
| 6,060,995 A | 5/2000 | Wicks et al. | |
| 6,064,860 A | 5/2000 | Ogden | |
| 6,069,668 A | 5/2000 | Woodham, Jr. et al. | |
| D426,527 S | 6/2000 | Sakaguchi | |
| 6,078,954 A | 6/2000 | Lakey et al. | |
| 6,080,063 A | 6/2000 | Khosla | |
| 6,084,584 A | 7/2000 | Nahi et al. | |
| 6,088,045 A * | 7/2000 | Lumelsky et al. | 345/531 |
| 6,095,423 A | 8/2000 | Houdeau et al. | |
| 6,097,441 A | 8/2000 | Allport | |
| 6,097,967 A | 8/2000 | Hubbe et al. | |
| 6,100,925 A | 8/2000 | Rosser et al. | |
| 6,104,414 A | 8/2000 | Odryna et al. | |
| 6,112,074 A | 8/2000 | Pinder | |
| 6,121,966 A | 9/2000 | Teodosio et al. | |
| 6,124,862 A | 9/2000 | Boyken et al. | |
| 6,125,259 A | 9/2000 | Perlman | |

(56) References Cited

U.S. PATENT DOCUMENTS

| | | | |
|---|---|---|---|
| 6,128,143 A | 10/2000 | Nalwa | |
| 6,131,025 A | 10/2000 | Riley et al. | |
| 6,133,946 A | 10/2000 | Cavallaro et al. | |
| 6,137,525 A | 10/2000 | Lee et al. | |
| 6,144,375 A | 11/2000 | Jain et al. | |
| 6,166,734 A | 12/2000 | Nahi et al. | |
| 6,192,257 B1 | 2/2001 | Ray | |
| 6,195,090 B1 | 2/2001 | Riggins et al. | |
| 6,209,028 B1 | 3/2001 | Walker et al. | |
| 6,215,475 B1 | 4/2001 | Meyerson et al. | |
| 6,327,570 B1 | 12/2001 | Stevens | |
| 6,330,021 B1 | 12/2001 | Devaux | |
| 6,347,301 B1 | 2/2002 | Bearden, III et al. | |
| 6,351,252 B1 | 2/2002 | Atsumi et al. | |
| 6,356,905 B1 | 3/2002 | Gershman et al. | |
| 6,380,978 B1 | 4/2002 | Adams et al. | |
| 6,385,772 B1 | 5/2002 | Courtney | |
| 6,401,085 B1 | 6/2002 | Gershman et al. | |
| 6,417,853 B1 | 7/2002 | Squires et al. | |
| 6,421,031 B1 | 7/2002 | Ronzani et al. | |
| 6,424,369 B1 | 7/2002 | Adair et al. | |
| 6,434,403 B1 | 8/2002 | Ausems et al. | |
| 6,434,530 B1 | 8/2002 | Sloane et al. | |
| 6,463,299 B1 | 10/2002 | Macor | |
| 6,466,202 B1 | 10/2002 | Suso et al. | |
| 6,505,055 B1 | 1/2003 | Kahn et al. | |
| 6,522,352 B1 | 2/2003 | Strandwitz et al. | |
| 6,525,762 B1 | 2/2003 | Mileski et al. | |
| 6,526,580 B2 | 2/2003 | Shimomura | |
| 6,532,152 B1 | 3/2003 | White et al. | |
| 6,535,254 B1 | 3/2003 | Olsson et al. | |
| 6,535,493 B1 | 3/2003 | Lee et al. | |
| 6,549,229 B1 | 4/2003 | Kirby et al. | |
| 6,564,070 B1 | 5/2003 | Nagamine et al. | |
| 6,567,079 B1 | 5/2003 | Smailagic et al. | |
| 6,570,889 B1 | 5/2003 | Stirling-Gallacher et al. | |
| 6,574,672 B1 | 6/2003 | Mitchell et al. | |
| 6,578,203 B1 | 6/2003 | Anderson, Jr. et al. | |
| 6,597,346 B1 | 7/2003 | Havey et al. | |
| 6,624,846 B1 | 9/2003 | Lassiter | |
| 6,669,346 B2 | 12/2003 | Metcalf | |
| 6,681,398 B1 * | 1/2004 | Verna | 725/141 |
| 6,697,103 B1 | 2/2004 | Fernandez et al. | |
| 6,745,048 B2 | 6/2004 | Vargas et al. | |
| 6,781,635 B1 | 8/2004 | Takeda | |
| 6,782,238 B2 | 8/2004 | Burg et al. | |
| 6,785,814 B1 | 8/2004 | Usami et al. | |
| 6,850,777 B1 | 2/2005 | Estes et al. | |
| 6,931,290 B2 | 8/2005 | Forest | |
| 6,934,510 B2 | 8/2005 | Katayama | |
| 6,952,558 B2 | 10/2005 | Hardacker | |
| 6,961,430 B1 | 11/2005 | Gaske et al. | |
| 7,006,164 B1 * | 2/2006 | Morris | 348/836 |
| 7,149,549 B1 * | 12/2006 | Ortiz et al. | 455/566 |
| 7,210,160 B2 * | 4/2007 | Anderson et al. | 725/81 |
| 7,227,952 B2 | 6/2007 | Qawami et al. | |
| 7,268,810 B2 | 9/2007 | Yoshida | |
| 7,376,388 B2 | 5/2008 | Ortiz et al. | |
| 7,448,063 B2 | 11/2008 | Freeman | |
| 7,620,426 B2 | 11/2009 | Ortiz et al. | |
| 7,725,073 B2 * | 5/2010 | Anderson et al. | 455/3.06 |
| 7,826,877 B2 | 11/2010 | Ortiz et al. | |
| 7,859,597 B2 | 12/2010 | Anderson, Jr. et al. | |
| 7,929,903 B2 * | 4/2011 | Anderson et al. | 455/3.06 |
| 8,090,321 B2 | 1/2012 | Ortiz et al. | |
| 2001/0016486 A1 | 8/2001 | Ko | |
| 2001/0030612 A1 | 10/2001 | Kerber et al. | |
| 2001/0034734 A1 | 10/2001 | Whitley | |
| 2001/0039180 A1 | 11/2001 | Sibley et al. | |
| 2001/0039663 A1 | 11/2001 | Sibley | |
| 2001/0039664 A1 | 11/2001 | Sibley | |
| 2001/0042105 A1 * | 11/2001 | Koehler et al. | 709/217 |
| 2001/0047516 A1 | 11/2001 | Swain et al. | |
| 2002/0007490 A1 | 1/2002 | Jeffery | |
| 2002/0014275 A1 | 2/2002 | Blatt et al. | |
| 2002/0046405 A1 | 4/2002 | Lahr | |
| 2002/0052965 A1 | 5/2002 | Dowling | |
| 2002/0057365 A1 | 5/2002 | Brown | |
| 2002/0063799 A1 | 5/2002 | Ortiz et al. | |
| 2002/0069416 A1 | 6/2002 | Stiles | |
| 2002/0069419 A1 | 6/2002 | Raverdy et al. | |
| 2002/0090217 A1 | 7/2002 | Limor et al. | |
| 2002/0091723 A1 | 7/2002 | Traner et al. | |
| 2002/0095682 A1 | 7/2002 | Ledbetter | |
| 2002/0104092 A1 | 8/2002 | Arai et al. | |
| 2002/0108125 A1 | 8/2002 | Joao | |
| 2002/0115454 A1 | 8/2002 | Hardacker | |
| 2002/0122137 A1 | 9/2002 | Chen et al. | |
| 2002/0130967 A1 | 9/2002 | Sweetser | |
| 2002/0138582 A1 | 9/2002 | Chandra et al. | |
| 2002/0138587 A1 | 9/2002 | Koehler | |
| 2002/0152476 A1 | 10/2002 | Anderson et al. | |
| 2003/0004793 A1 | 1/2003 | Feuer et al. | |
| 2003/0005052 A1 | 1/2003 | Feuer et al. | |
| 2003/0005437 A1 | 1/2003 | Feuer et al. | |
| 2003/0005457 A1 | 1/2003 | Faibish | |
| 2003/0014275 A1 | 1/2003 | Bearden, III et al. | |
| 2003/0023974 A1 | 1/2003 | Dagtas et al. | |
| 2003/0204630 A1 | 10/2003 | Ng | |
| 2004/0034617 A1 | 2/2004 | Kaku | |
| 2004/0073437 A1 | 4/2004 | Halgas et al. | |
| 2004/0207719 A1 | 10/2004 | Tervo et al. | |
| 2004/0243922 A1 | 12/2004 | Sirota et al. | |
| 2005/0076387 A1 | 4/2005 | Feldmeier | |
| 2006/0174297 A1 * | 8/2006 | Anderson et al. | 725/100 |
| 2007/0060200 A1 | 3/2007 | Boris et al. | |
| 2007/0107028 A1 * | 5/2007 | Monroe et al. | 725/105 |
| 2007/0207798 A1 | 9/2007 | Talozi et al. | |

FOREIGN PATENT DOCUMENTS

| | | |
|---|---|---|
| GB | 2 288 300 A | 10/1995 |
| GB | 2372892 | 9/2002 |
| JP | 10136277 | 5/1998 |
| JP | 20010275101 | 10/2001 |
| WO | WO 9411855 | 5/1994 |
| WO | WO 9966670 | 12/1999 |
| WO | WO 0054554 | 9/2000 |
| WO | WO-2004/002130 A2 | 12/2003 |
| WO | WO 2004/034617 | 4/2004 |

OTHER PUBLICATIONS

Choiceseat™ Fact Sheet; Jun. 13, 1007; 4 pgs.
ChoiceSeat—Events Operations Manual for Madison Square Garden; Dec. 15, 1999; Intel Corporation; 91 pgs.
ChoiceSeat™; www.choiceseat.net; 1999 Williams Communications; 71 pgs.
ChoiceSeat—System Administrator's Binder for Madison Square Garden; Dec. 17, 1999; 80 pgs.
ChoiceSeat—In Your Face Interactive Experience—1998 SuperBowl; Broncos v. Packers; 15 pgs.
In-Seat Interactive Advertising Device Debuts; Nov. 19, 1999; Williams; 2 pgs.
Reality Check Studios Goes Broadband with Production for Choiceseat at Madison Square Garden; Dec. 1, 1999; 3 pgs.
Press Release: Vela Research LP to Supply Encoding for ChoiceSeat at SuperBowl XXXII; Jan. 13, 1998; 2 pgs.
Ruel's Report: ChoiceSeat; ChoiceSeat makes Worldwide Debut at the 1998 Super Bowl in San Diego California; Sep. 1, 1997; 9 pgs.
San Diego Metropolitan; Jan. 1998; 29 pgs.
Stadium fans touch the future—Internet Explorer and touch screens add interactivity to Super Bowl XXXII; Jan. 26, 1998; 2 pgs.
Telephony online Intelligence for the Broadband Economy; Fans take to ChoiceSeats: Interactive technology, e-commerce expand to sporting events; Jan. 10, 2000; 2 pgs.
Williams ChoiceSeat interactive network launches inaugural season with Tampa Bay Devil Rays; expands features for second season; Mar. 30, 1998; 2 pgs.
Williams Communications; ChoiceSeat™ demonstrates the interactive evolution of sports at Super Bowl™ XXXIII; Jan. 20, 1999; 2 pgs.

(56) References Cited

OTHER PUBLICATIONS

ChoiceSeat The Premiere Provider of Interactive Event Entertainment; 18 pgs.
Choice Seat Specification; Version 2.2; Ethernet Model; Williams Communications Group; Oct. 10, 1997; 13 pgs.
ChoiceSeat Intellectual Property List; 3 pgs.
CSI Incorporated Draft; Schedule A-IP; Schedule of Patents; 2 pgs.
HK-388P/PW Color Camera Operation Manual; vol. 2; Ikegami; 280 pgs.
Eric Breier; Computer age comes to ballpark; Quallcomm is test site for ChoiceSeat's sports televisio Robert Carter; Web Technology: It's in THE Game; SiteBuilder network; Dec. 15, 1997; 1 pg.n network; Aug. 1997; 2 pgs.
Robert Carter; Web Technology: It's in THE Game; SiteBuilder network; Dec. 15, 1997; 1 pg.
ChoiceSeat™ Fact Sheet; Project: Super Bowl XXXII; Qualcomm Stadium, San Diego, Calif., USA; Jan. 25, 1998; 1 pg.
Screen Shot Super Bowl XXXII; Jan. 25, 1998; 1 pg.
Vyvx® ChoiceSeat Cover; 1 pg.
Welcome to the Interactive Evolution of Sports. ChoiceSeat™; Jan. 1998; 1 pg.
The Ultimate Super Bowl Experience! Williams ChoiceSeat™ Jan. 1998; 1 pg.
Bradley J. Fikes; Super Bowl XXXII; It's just business; For lucky 600 fans, there'll be TV sets at the seats; San Diego North County Times; Jan. 1998; 1 pg.
D.R. Stewart; Williams Interactive Video Gives Football Fans Choice; Tulsa World; Jan. 1998; tulsaworld.com; 2 pgs.
ChoiceSeat Handout; Welcome to the Interactive Evolution of Sports. www.choiceseat.net; 1 pg.
Cyberscope; Just Call It Wired Bowl; Jan. 28, 1998; 1 pg.
Ruel.Net Set-Top Page Interactive TV Top.Box.News; Ruel's Report: ChoiceSeat; Fall 1998; 7 pgs.
Williams ChoiceSeat interactive network launches inaugural season with Tampa Bay Devil Rays; expands features for second season with San diego Padres; www.williams.com/newsroom/news_releases;March 30, 1998; 2 pgs.
The Herald: Super Bowl Turns Techno Bowl; Jan. 24, 1999; 1 pg.
Williams communications' ChoiceSeat™ demonstrates the interactive evolution of sports at Super Bowl™ XXXIII; http://www.williams.com/newsroom/news_releases; Jan. 20, 1999; 3 pgs.
NTN Interactive games available on ChoiceSeat™ during Super Bowl XXXIII; Jan. 1999; 1 pg.
Williams Fact Sheet; Super Bowl™ XXXIII; Pro Player Stadium, Miami, Florida, USA; Jan. 31, 1999; 1 pg.
Super Bowl XXXIII Game Recap; http://www.nfl.com/superbowl/history/recap/sbxxxiii; 8 pgs.
ChoiceSeat™ User Guide; New York Knicks; The Garden Fanlink; 8 pgs.
ChoiceSeat™ User Guide; New York Rangers; The Garden Fanlink; 8 pgs.
ChoiceSeat™ Flow Chart; New York Knicks; The Garden Fanlink; 1 pg.
ChoiceSeat™ Presentation Document; The "Be There" Experience; 15 pgs.
In-Seat Interactive Advertising Device Debuts; http://www.williams.com/newsroom/news_releases; Nov. 19, 1999; 2 pgs.
Intel and ChoiceSeat™ collaborate to advance interactive sports technology; http://www.williams.com/newsroom/news_releases; Nov. 29, 1999; 3 pgs.
Media Coverage; ChoiceSeat The Interactive Evolution of Sports; Good News Travels Fast.; 1 pg.
Screen Shot: ChoiceSeat The Interactive Evolution of Sports; 1 pg.
Digital Video; ChoiceSeat Coverage; www.dv.com; Apr. 2000; 11 pgs.
Wall Street Journal; With Wired Seats, Fans Get Replays, Rules, Snacks; May 21, 2000; 1 pg.
Wireless History; www.jhsph.edu/wireless/story; 5 pgs.
Wikipedia; Wireless LAN; 4 pgs.
Proposed ChoiceSeat Client Specification Summary; Initial Draft Aug. 29, 1997; Updated Sep. 30, 1997; 2 pgs.
Proposed ChoiceSeat Network Specification Summary; Initial Draft Aug. 25, 1997; 2 pgs.
Proposed ChoiceSeat Network Specification Summary; Updated Draft Sep. 30, 1997; 4 pgs.
Quallcomm Stadium ChoiceSeat Network Diagram; May 11, 1998; 5 pgs.
Schedule of Personal Property; Patents; Software and Trademarks etc Draft; 3 pgs.
PCT International Search Report dated Feb. 5, 2004; In re International Application No. PCT/US03/31696.
Written Opinion cited document in International Application No. PCT/US03/31696.
Office Action dated Aug. 10, 2007; U.S. Appl. No. 10/630,069, filed Jul. 30, 2003; Applicant: Tazwell L. Anderson, Jr.; 11 pages.
Office Action dated Aug. 23, 2007; U.S. Appl. No. 09/837,128, filed Apr. 18, 2001; Applicant: Tazwell L. Anderson, Jr.; 13 pages.
Office Action dated Sep. 7, 2007; U.S. Appl. No. 10/453,385, filed Jul. 30, 2003; Applicant: Tazwell L. Anderson, Jr.; 14 pages.
Dapeng, Wu; et al; "On End-to-End Architecture for Transporting MPEG-4 Video Over the Internet" IEEE Transaction vol. 10, No. 6, Sep. 2000, 19 pgs.
Capin, Tolga K., Petajen, Eric and Ostermann, Joern; "Efficient Modeling of Virtual Humans in MPEG-4" IEEE 2000, 4 pgs.
Battista, Stafano; Casalino, Franco and Lande, Claudio; "MPEG-4: A Multimedia Standard for the Third Millennium, Part 1"; IEEE 1999, 10 pgs.
Wireless Dimensions Corporation Adds to Mobile-Venue Suite™; Press Release, Wireless Dimensions; Allen, Texas; Jul. 26, 2000; www.wirelessdimensions.net/news.html , 6 pgs.
Seeing is Believing—Motorola and PacketVideo Demonstrate MPEG4 Video Over SPRS; Publication: Business Wire Date: Wednesday, May 10, 2000; www.allbusiness.com; 4pgs.
Adamson, W.A.; Antonelli, C.J.; Coffman, K.W.; McDaniel, P.; Rees, J.; Secure Distributed Virtual Conferencing Multicast or Bust; CITI Technical Report 99-1; Jan. 25, 1999; 8 pgs.
SGI and the Pepsi Center; 2 pgs.
Office Action dated Sep. 10, 2007; U.S. Appl. No. 10/680,612, filed Oct. 7, 2003; Applicant: Tazwell L. Anderson, Jr.; 19 pages.
Spanberg, Erik; "Techies Hit the Fast Track"; The Business Journal. Charlotte: Jul 30, 1999; vol. 14, Iss. 17; pp. 3.
Hiestand, Michael; Up Next: Rent Wireless Video Devices at games: [Final Edition]; USA Today; McLean, VA: Jan. 29, 2002; pp. 2.
PR Newswire; Baseball Fans to Get Best of Both Worlds: Seats in the Stadium and Up Close Camera Shots; New York; Mar. 22, 2002; 2 pgs.
Sony GV S50 Video Walkman Operating Instructions; 1992; 3 pgs.
U.S. Appl. No. 60/071,119, filed Jan. 12, 1998, Verna.
U.S. Appl. No. 60/110,468, filed Nov. 30, 1998, Verna.
Bryan et al.; "Man-Portable Networked Sensor System"; Report—Space and Naval Warfare Systems Center, San Diego, CA 92152; 11 pages; Apr. 1998.
Callan; "Microsurveillance of the Urban Battlefield"; Report No. JSR-95-125; The MITRE Corporation, McLean, Virginia 22102; 70 pages; Feb. 1996.
Cheyer et al.; "MVIEWS: Multimodal Tools for the Video Analyst"; *IUI '98 Proceedings of the 3rd International Conference on Intelligent User Interfaces;* 8 pages; published 1998.
Gandsas et al.; "Wireless Live Streaming Video of Laparoscopic Surgery: A Bandwidth Analysis for Handheld Computers"; *10th Annual Medicine Meets Virtual Reality Conference;* 5 pages; Jan. 2002.
Griffioen et al.; "Teaching in Real-time Wireless Classrooms"; *Journal of Engineering Education;* pp. 397-402; Oct. 1999.
Truman et al.; "The InfoPad Multimedia Terminal: A Portable Device for Wireless Information Access"; *IEEE Transactions on Computers;* vol. 47; No. 10; pp. 1073-1087; Oct. 1998.

* cited by examiner

SYSTEM AND METHOD FOR PROVIDING EVENT SPECTATORS WITH AUDIO/VIDEO SIGNALS PERTAINING TO REMOTE EVENTS

CROSS REFERENCE TO RELATED APPLICATIONS

This application is a continuation and claims priority to copending Non-Provisional U.S. patent application assigned Ser. No. 12/557,725 filed Sep. 11, 2009, which is a continuation and claims priority to copending Non-Provisional U.S. patent application assigned Ser. No. 11/070,353 filed Mar. 2, 2005, now U.S. Pat. No. 7,593,687, which is a continuation-in-part and claims priority to copending Non-Provisional U.S. patent application assigned Ser. No. 10/680,612 and filed on Oct. 7, 2003, now U.S. Pat. No. 7,725,073 all entitled "SYSTEM AND METHOD FOR PROVIDING EVENT SPECTATORS WITH AUDIO/VIDEO SIGNALS PERTAINING TO REMOTE EVENTS" and all of which are hereby incorporated by reference in their entirety.

BACKGROUND OF THE INVENTION

This invention relates generally to video and audio signal processing techniques and, more particularly, to methods and systems for receiving video and audio signals from a plurality of sources and for providing a user with combinations of these signals from which to select.

Spectators attending a stadium for viewing an event, such as a sporting event, for example, are often interested in events simultaneously occurring at other locations, such as, other stadiums. As an example, a spectator attending a football game at a stadium may be interested in other football games at other stadiums, particularly at other stadiums within the same general region, for example, hearing commentary or viewing images of other games.

Radio stations may broadcast AM and/or FM audio signals of stadium events. Such audio signals normally define the comments of one or more commentators who watch a stadium event and comment on the event as it is occurring such that listeners of the audio broadcast may receive real-time information pertaining to the stadium event. For sporting events, the commentary provided by such commentators is often referred to as a "play-by-play" commentary.

Moreover, a spectator at one stadium may utilize a radio to receive at least one audio event signal from a radio station, which may be any audio signal that provides information (e.g., real-time and/or prerecorded information) pertaining to the event. The radio broadcast allows a spectator to hear information pertaining to an event occurring at another stadium. Unfortunately, an audio event signal pertaining to a stadium event of interest to a spectator is not always broadcast by a radio station using AM or FM signals, thereby preventing spectators outside the stadium from receiving the broadcast. Further, in situations where an audio event signal of interest to a spectator is broadcast in such a manner that it may be received, the spectator may be attending a stadium event out of range of the audio event signal of interest. Thus, a spectator at one stadium is not always able to receive an audio event signal providing detailed audio information about an event occurring at another stadium. A spectator likewise may be unable to receive a video event signal providing detailed video information about an event occurring at another stadium.

Further, spectators may be interested in viewing or accessing other content while at an event. For example, a spectator may want to check the news during half-time of a game. However, known systems do not allow spectators to selectively access different content from different sources while at an event.

BRIEF DESCRIPTION OF THE INVENTION

In one exemplary embodiment, a system for providing content for access by a portable device at an event includes an interface to receive signals from a plurality of sources. The plurality of sources are located at an event and remote from the event. The signals define event content and non-event content. The system further includes a processor for processing the received signals to generate combined signals based upon the received signals from the plurality of sources. The system also includes a transmitter for transmitting to a plurality of portable devices at the event the combined signals. The combined signals are configured to allow a user to select content using the portable device receiving the combined signals.

In another exemplary embodiment, a method for providing content for access by a portable device at an event includes receiving at an event a plurality of signals from a plurality of sources. The plurality of signals define event content and non-event content. The method further includes determining received signals to combine to define at least one combined signal. The method also includes broadcasting the at least one combined signal at the event, with the at least one combined signal configured to be received by at least one portable device.

In yet another exemplary embodiment, a method for providing content for access by a user at an event includes receiving via a portable device event content and non-event content defined by at least one signal combined from a plurality of signals from a plurality of sources. The method further includes outputting at least one of video and audio content based upon at the at least one signal.

DETAILED DESCRIPTION OF THE INVENTION

Figure 1:
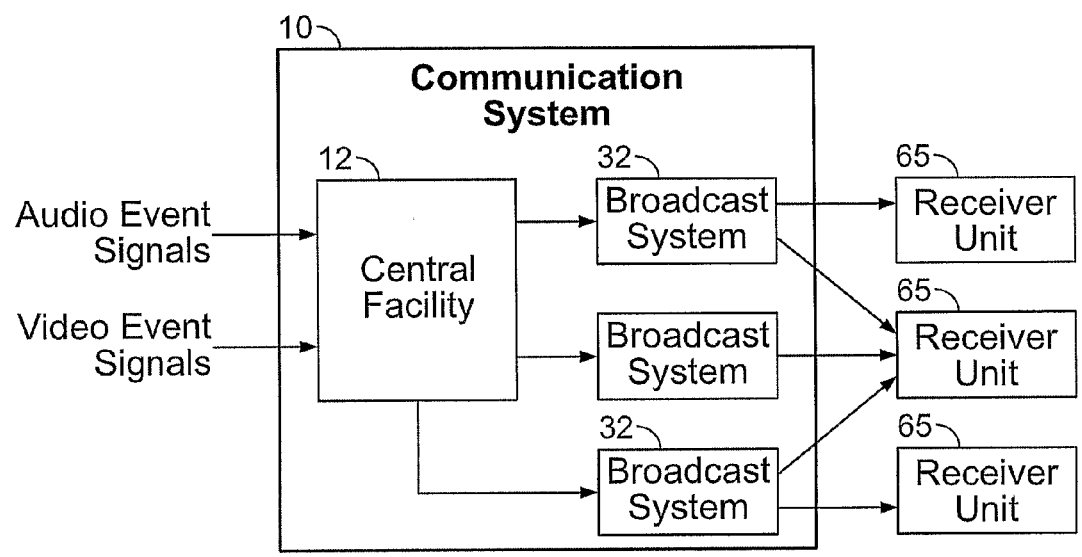
FIG. 1 is a block diagram of a communication system in accordance with one exemplary embodiment of the present invention.

Exemplary embodiments of methods and systems providing spectators at an event with a plurality of audio and video event signals pertaining to other remote events and other content, and from which a spectator may select one or more of the audio and video event signals are described below in detail. A technical effect of the methods and systems described herein include at least one of generating a plurality of different audio and/or video signals at one or more remote locations (e.g., generating multiple audio signal events at different stadiums, with the audio signal events defining information, such as play-by-play commentary pertaining to events at the different stadiums), transmitting the plurality of audio and/or video signals to a central facility, wherein the audio and/or video signals are selectively transmitted to broadcast systems that each service one or more events (e.g., one or more stadiums), and allowing spectators to select from the audio and/or video signals transmitted via the broadcast systems.

It should be noted that when reference is made herein to audio and/or video event signals, this refers to any audio or video signal generated and/or transmitted to and/or from an event, such as, for example, audio and video signals that provide information, including, but not limited to, real-time and/or prerecorded information, pertaining to an event or other content from different sources. It should also be noted that when reference is made herein to non-event or non-event related audio and/or video signals, this refers to any live, delayed, or archived and recorded audio and/or video signals such as for example, live audio and/or video signals being generated from another event, rebroadcast audio and/or video signals from an another event, any other live or recorded audio/video content, such as, for example, content relating to sporting events, entertainment events (e.g. movies, cartoons, advertisements, statistics and data) and or other third party content (e.g., news).

In the exemplary embodiments, the methods generally provide spectators at an event with a selection of audio and/or video event signals pertaining to other remote events that may be of interest to the spectators. In particular, a plurality of different audio and/or video event signals are generated at various locations (e.g., remote locations). For example, multiple audio event signals may be generated at different stadiums, and each audio event signal may define information, such as a play-by-play commentary pertaining to the event occurring at the stadium from which the audio event signal is generated or from another stadium.

Each of the audio and/or video event signals may be transmitted to a central facility, and various communication techniques may be employed to communicate the audio and/or video event signals to the central facility. In an exemplary embodiment, audio and/or video event signals are communicated to a central facility via a communication network (e.g., an existing or specifically designed network), such as the publicly switched telephone network (PSTN). In order to increase performance, the audio and/or video event signals may be transmitted over a high speed communication link, such as, for example, a T1 communication line. It should be noted that the communication links utilized to transmit the audio and/or video event signals to the central facility are not limited to specific types of links or physical land lines, but may include, for example, terrestrial links and/or satellite links.

At the central facility, the audio and/or video event signals may be selectively coalesced and transmitted to a plurality of broadcast systems that each service one or more events and/or stadiums. For example, a determination may be made that spectators at a particular stadium are likely to be interested in particular ones of the audio event signals. In an exemplary embodiment, such audio event signals are then transmitted to the broadcast system servicing the particular stadium. The broadcast system then may broadcast the audio event signal to the spectators being serviced by the broadcast system. For example, a determination may be made that spectators at a first stadium for viewing a Southeastern Conference (SEC) football game are interested in other SEC football games occurring at other stadiums. In such a case, audio event signals defining the play-by-play commentary of the other SEC football games may be transmitted, by the central facility, to the broadcast system servicing the first stadium. The broadcast system may then broadcast these audio event signals to the spectators at the first stadium.

For other stadiums, different sets of audio event signals may be provided. For example, for a stadium where a BIG 10 football game is occurring, the central facility may transmit to the broadcast system servicing that stadium, audio event signals pertaining to other BIG 10 football games. These audio event signals may then be broadcast to the spectators of the stadium via the broadcast system. Further, and as another example, for a stadium where a Major League Baseball (MLB) game is occurring, audio event signals pertaining to other MLB baseball games may be transmitted to the broadcast system servicing the stadium. Various combinations of audio event signals thereby may be provided to spectators at various stadiums and are not limited to the combinations described herein. It should be noted that video event signals likewise may be communicated as described herein.

Transmission of a set of audio and/or video event signals to a particular broadcast system may occur via various transmission methodologies. In an exemplary embodiment, the audio and/or video event signals are communicated to the broadcast systems via a communication network (e.g., an existing or specifically designed network), such as, for example, the PSTN. To provide increased performance, the audio and/or video event signals may be transmitted over high speed communication links such as, for example, a T1 communication line. It should be noted that the communication links utilized to transmit the audio and/or video event signals to the broadcast systems are not limited to specific types of links or physical land lines, but may include, for example, terrestrial links and/or satellite links. Furthermore, audio and/or video event signals may be generated as or may be converted into digital signals in order to enable better and/or faster transmission to and/or from a broadcast system.

In an exemplary embodiment, when a broadcast system receives audio and/or video event signals from the central facility, the broadcast system may communicate such signals to spectators at the stadium serviced by the broadcast system. The communication of such signals may be wireless and/or non-wireless. For example, the broadcast system may modulate each of the audio and/or video event signals on a carrier signal of a different frequency and wirelessly transmit the modulated signals to the stadium spectators. The stadium spectators may be provided with portable receiver units that demodulate and filter the audio and/or video event signals transmitted by the broadcast system. Specifically, using a receiver unit, a spectator may select one or more of the audio and/or video event signals received by the receiver unit, and the receiver unit may filter out all of the other audio and/or video event signals, thereby recovering the selected audio and/or video event signal or signals. The recovered audio and/or video event signal or signals may then be converted into sound via one or more speakers of the receiver unit or images via a display of the receiver unit.

It should be noted that a broadcast system and, in particular, an antenna of the broadcast system may be located at or close to the stadium serviced by it. In such an embodiment, the audio and/or video event signals transmitted by the broadcast system can be transmitted over a short distance (e.g., less than approximately one-half of a mile), thereby limiting various restrictions imposed by regulation agencies, such as the Federal Communication Commission (FCC). Various frequency ranges may be employed, for example, each broadcast system in an exemplary embodiment may transmit audio and/or video event signals within the ultra-high frequency (UHF) range, microwave range (e.g., two to ten gigahertz range), etc.

Figure 2:
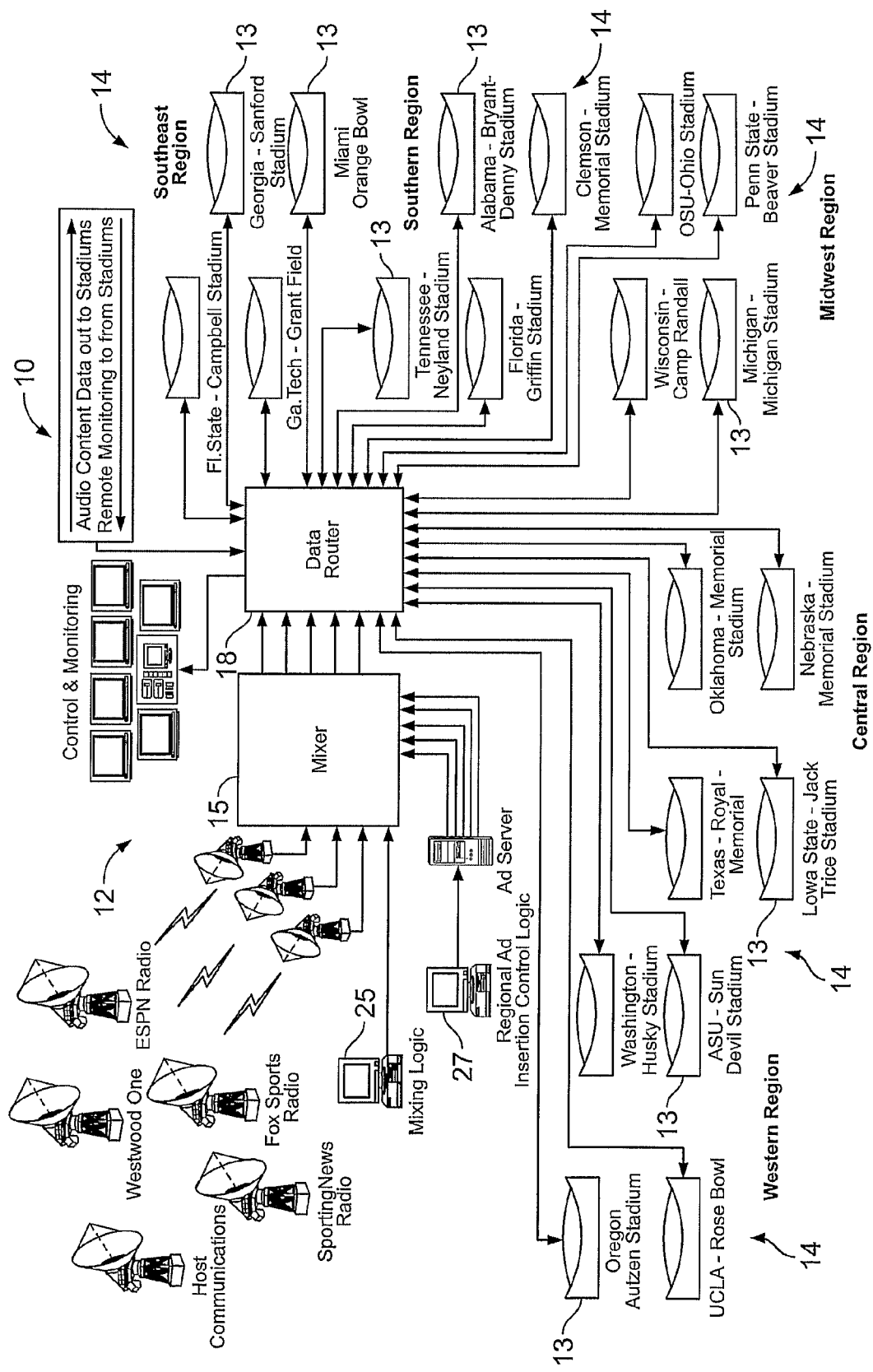
FIG. 2 is a block diagram of a central facility system in accordance with one exemplary embodiment of the present invention.
Figure 3:
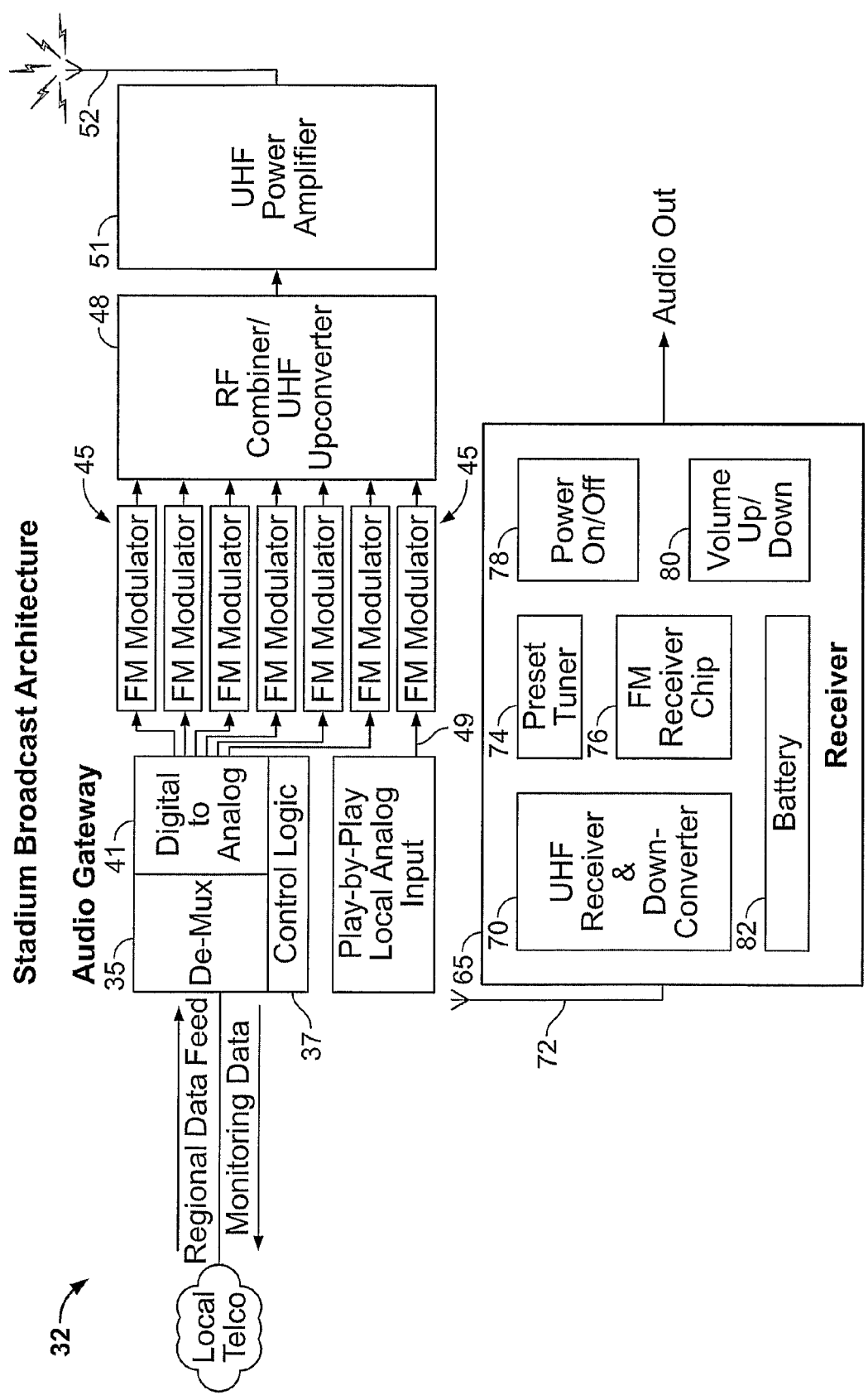
FIG. 3 is a block diagram of a broadcast system in accordance with one exemplary embodiment of the present invention.

FIGS. 1 through 3 illustrate exemplary embodiments of a communication system 10 that will be described in more detail below. For illustrative purposes, the communication system 10 will be described as enabling spectators attending NCAA football games at stadiums to select and hear a play-by-play commentary and/or see video images of various football games. However, it should be noted that, in other embodiments, the communication system 10 may enable spectators to listen to and view other types of information pertaining to other types of events (e.g., football, auto racing, golf, horse racing, etc.) located at different venues (e.g., race track, open road race course, golf course, etc.) or other types of information (e.g., advertisements).

FIG. 1 is a block diagram of a communication system 10 of an exemplary embodiment of the present invention. The communication system includes a central facility 12 for receiving audio and/or video signals (e.g., audio and/or video feeds and audio and/or video event signals) from a plurality of sources (e.g., local event and remote sources). The central facility 12 combines various audio and/or video signals as described herein for transmission to one or more broadcast systems 32. The broadcast systems 32 will be described in more detail with reference to FIGS. 5 and 6. In an exemplary embodiment, a separate broadcast system is provided in connection with or corresponding to each of a plurality of events or, for example, a plurality of stadiums. The broadcast systems 32 transmit a plurality of audio and/or video signals to receiver units 65, which allow users attending events, for example, at various stadiums to select audio and or video signals from one or more sources. The audio and video signals define content for audio output or display with the receiver units 65. The sources may be located at the event at which the spectator is attending and providing audio and video signals pertaining to that event, or may be located remote from the event attended by the spectator, and provide audio and video signals pertaining to the remote event. Further, the sources may provide audio and video signals pertaining to other content, such as, for example, advertising.

As shown in FIG. 2, audio and/or video signals, for example, play-by-play feeds defining play-by-play commentaries of various football games are transmitted to the central facility 12. These play-by-play feeds may be transmitted via satellite, T1, and/or other types of communication links. Further, the play-by-play feeds may be transmitted as digital or analog signals. In an exemplary embodiment, the play-by-play feeds are generated as digital signals or converted into digital signals before being transmitted to the central facility 12.

The central facility 12, in an exemplary embodiment, includes a feed mixer 15 and a data router 18. The feed mixer 15 combines the audio and/or video feeds and transmits the audio and/or video feeds to the data router 18. The feed mixer 15 combines the play-by-play feeds such that, for example, play-by-play feeds that are likely to be of interest to a group of spectators or users are combined together. For example, the play-by-play feeds may be mixed such that play-by-play feeds associated with games or teams within or from the same region are combined (e.g., multiplexed) together.

For example, stadiums 13 participating in (e.g., serviced by) the communication system 10 may be categorized based on their regional location. As shown in FIG. 2, the stadiums 13 may be categorized into a plurality of regions 14, such as first through fifth regions (e.g., a Southeast Region, a Southern Region, a Midwest Region, a Central Region, and a Western Region). Each play-by-play feed from the same region may be combined by the feed mixer 15. Therefore, the feed mixer 15 may output combined signals in which each combined signal comprises play-by-play feeds from the same region. For example, one of the combined signals may comprise play-by-play feeds from each stadium within the Southern Region that is hosting a football game. Such a combined signal may comprise play-by-play feeds from Neyland Stadium, Bryant-Denny Stadium, Griffin Stadium, and Memorial Stadium (Clemson).

The mixing of play-by-play feeds as described herein may be controlled by mixing logic 25. In one exemplary embodiment, the mixing logic 25 (e.g., user interface such as a computer) receives inputs from a user and mixes the play-by-play feeds based on these inputs, thereby allowing a user to control which feeds are mixed together. In another exemplary embodiment, user preferences (e.g., viewing preferences) or predetermined criteria (e.g., closest games) are used control which feeds are mixed together. Further, another content insertion control logic 27 may be configured to insert, for example, advertisements and/or commercials into the feeds mixed by the feed mixer 15. It should be noted that the mixing logic 25 and the other content insertion control logic 27 may each be implemented in hardware, software, or any combination thereof.

The data router 18 may be configured to transmit each of the combined signals to, for example, corresponding events or ones of the stadiums. For example, a combined signal including feeds likely to be of interest to spectators at Neyland Stadium may be transmitted to Neyland stadium. Because spectators attending a sporting event at a stadium are likely to be interested in similar sporting events occurring within the same approximate region, a combined signal having one or more play-by-play feeds from a particular region may be transmitted to the stadiums within the same region. For example, a combined signal including play-by-play feeds from football games within the Southern Region may be transmitted to one or more stadiums within this same region. As a result, the play-by-play feeds defining the combined signal received by a particular stadium are likely to be of interest to the spectators at the particular stadium. In the exemplary embodiment shown in FIG. 2, the combined signals are communicated to the stadiums over a telecommunication network using high speed communication links, such as T1 connections. However, other types of communication techniques may be employed in other embodiments. Further, it should be noted that various other methodologies for determining which stadiums are to receive which feeds may be employed in other exemplary embodiments as desired or needed and as described herein.

Referring now to FIG. 3, and for example, for each event or stadium, an exemplary embodiment of a broadcast system 32 receives the combined signal transmitted to it by the central facility 12 (shown in FIG. 2). A demultiplexer 35, controlled by control logic 37, demultiplexer the combined signal to thereby recover, for example, each play-by-play feed within the combined signal. A digital-to-analog (D/A) converter 41 converts each recovered play-by-play feed into analog form and provides each of the analog feeds to a modulator 45. Each modulator 45 modulates its received play-by-play feed onto a carrier signal of a different frequency, and a signal combiner 48 combines the modulated signals, which are then amplified by a power amplifier 51, before being wirelessly transmitted by an antenna 52. It should be noted that if the combined signal received by the broadcast system 32 of a particular stadium or associated with a particular event does not include, for example, a feed pertaining to the event occurring at the same stadium, a local play-by-play feed 49 generated at the stadium may be included in the feeds modulated by the modulators 45.

In one exemplary embodiment, one or more spectators, for example, at the stadium, is provided with a receiver unit 65 capable of receiving and demodulating the signals transmitted by the broadcast system 32. The selected audio and/or video signals, such as play-by-play feeds are then output by the receiver unit 65 (e.g., output as audio from a speaker or video from a display), thereby reproducing, for example, the play-by-play commentary or video images defined by the selected feed(s). For example, assume that a spectator at Neyland Stadium, while watching a Tennessee game occurring at Neyland Stadium, is interested in the football game occurring at Griffin Stadium. In such an example, the spectator may tune his receiver unit 65 (e.g., select a channel) such that the receiver unit 65 filters out all play-by-play feeds except the feed originally generated at Griffin stadium. As a result, the receiver unit 65 outputs the play-by-play commentary of the football game occurring at Griffin Stadium. Moreover, the spectator may listen to this commentary while watching the Tennessee football game or another game on the receiver unit 65.

In an exemplary embodiment, the receiver unit 65 is portable and allows the user to provide inputs for selecting at least one or more of the audio and/or video signals, such as, for example, play-by-play feeds and/or video signals of interest to the user. In another exemplary embodiment as shown in FIG. 3, a receiver unit 65 includes a receiver and converter component 70 that receives and converts each audio and/or video signal received from broadcast system 32 via antenna 52 and antenna 72. The receiver unit 65 also includes a tuner 74 for tuning the audio and/or video feed provided on different frequencies such that feeds on different frequencies can be output from the receiver unit 65.

Additional components for processing the different types of feeds (e.g., audio and video signals) may be provided, such as, for example, an FM receiver component 76 for receiving and processing frequency-modulated signals. The receiver unit 65 also may include user controls for controlling operation of the receiver unit 65 including a selector (not shown) for selecting between different feeds and sources, a display (not shown) for displaying event images from received video signals, a power on/off component 78 (e.g., switch) for powering on and off the receiver unit 65, and a volume up/down component 80 for controlling the volume output of the receiver unit 65. The receiver unit 65 also includes a power supply 82 (e.g., removable battery, rechargeable battery, etc.) for powering the receiver unit 65. It should be noted that although the receiver unit 65 has been described with particular component parts, it is not so limited, and additional or different component parts may be provided as desired or required (e.g., storage component for storing audio and/or video feeds).

It also should be noted that it is not necessary for the broadcast system 32 used to transmit signals, for example, to spectators at a particular stadium, to be located at or close to the particular stadium. However, locating the broadcast system 32 at or close to the stadium may be desired or needed (e.g., results in less strenuous FCC restrictions). Additionally, it is not necessary for the central facility 12 to selectively determine which of the audio and/or video signals (e.g., play-by-play feeds) are to be provided, for example, to the different stadiums. For example, the central facility 12 may be configured to provide each audio and/or vide signal to each of the stadiums regardless of each stadium's regional location. Further, it should be noted that video event signals in addition to or instead of audio event signals may be processed by the communication system 10 described above. For example, in addition to or instead of generating and providing a play-by-play audio signal of an event, a camera may generate a play-by-play video signal of the event. This video signal then may be transmitted to the central facility 12, which mixes the video signal with, for example, other audio and/or video signals from other events. After being transmitted to a broadcast system 32, the broadcast system 32 may modulate and transmit the video signal to, for example, spectators at the stadium, similar to the manner in which the audio signals are modulated and transmitted to spectators at a stadium, as described above. The receiver unit 65 may include a video display for displaying the video signal when such signal is selected by the spectator's input. An exemplary system for distributing the audio and/or video signals is described in U.S. Pat. No. 6,578,203, the entire disclosure of which is hereby incorporated by reference herein. For example, the system described therein may be employed to provide to spectators at a stadium the audio and/or video signals received from the central facility 12.

Moreover, the spectator may view a play-by-play video signal from an event at a remote stadium and may simultaneously listen to a play-by-play audio signal from the same event. Alternatively, the spectator may view a play-by-play video signal from an event at a remote stadium and may simultaneously listen to a play-by-play audio signal from another event at another remote stadium or from the stadium at which the spectator is present. Furthermore, it is not necessary for all of the signals processed by the communication system 10 to pertain to an event occurring at a stadium. For example, a spectator may view a play-by-play video signal pertaining to an event at a remote stadium while listening to an audio signal defining music unrelated to any of the events at any of the stadiums or a video signal defining programming unrelated to any of the events at any of the stadiums (e.g., advertisement or commercial).

Figure 4:
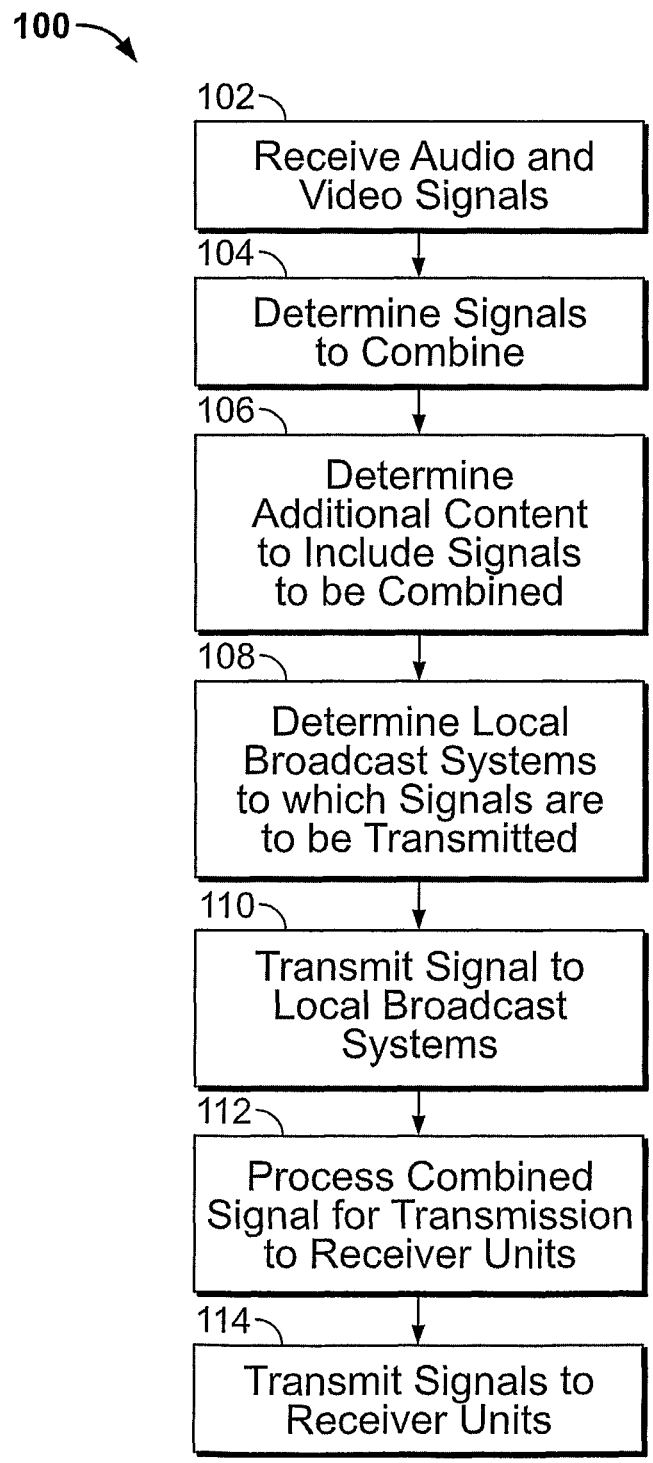
FIG. 4 is a flowchart of exemplary processes utilized by various embodiments of a communication system of the present invention.

FIG. 4 is a flowchart 100 illustrating exemplary processes utilized by the communication system 10. The technical effect of the communication system 10 is achieved by first receiving a plurality of audio and video signals from one or more sources (e.g., audio and video signals from a plurality of stadiums) at 102. A determination is then made at 104 as to which audio and video signals to combine. This may include, for example, categorizing the audio and video signals based upon the geographic location of the source of the signals (e.g., signals from stadiums within a particular geographic region or relating to teams in that region) and/or combining the signals based upon predetermined criteria (e.g., combine signals based upon user preferences). It should be noted that the audio and video signals may be combined based upon other criteria, determinations or factors, such as, for example, time of day (e.g., events occurring at the same time), the type of event (e.g., all sports events, all football games, all baseball games, etc.) and/or variety (e.g., combine signals to provide diverse programming). A determination is also made at 106 as to other content to be included as part of the signals to be combined (e.g., advertisements or commercials).

A determination is then made at 108 as to which broadcast systems 32 (shown in FIG. 1) the signals to be combined are to be transmitted. This also may include a determination of the type of communication link to use to transmit the combined signals. Based upon the determinations at 104, 106, 108 and any other user inputs (e.g., used specified content), combined signals are transmitted to the determined broadcast systems 32 at 110.

The combined signals are received by the broadcast systems 32 and processed (e.g., demultiplexed and modulated in analog form) at 112, for transmission (e.g., local transmission) to a one or more receiver units 65 (shown in FIG. 3), for example, within and in close proximity to a stadium. This processing may also include modulating the signals onto different frequencies. The processed signals are then broadcast at 114 to the receiver units 65 within the broadcasting range of the broadcast systems 32. For example, the signals may be broadcast to receiver units 65 within a stadium or within one hundred feet of the stadium. A user having a receiver unit 65 may then select the specific signals, for example, defining different feeds to output from the receiver unit 65.

In operation, a user with a receiver unit 65 at an event (e.g., football game) may select from different audio and video feeds that are broadcast at the event. For example, a user may select audio and/or video signals defining content from another event (e.g., another football game), video feeds of different angles or portions of the event being attended and/or other content such advertising and/or commercials. The audio and/or video content may be accessed real-time or stored for later hearing and/or viewing (e.g., to review a football play or listen to specific commentary). The selectable audio and video signals may be provided, for example, on predetermined channels selectable by a user. Further, the sources of these audio and video signals may be located at the event, remote from the event, or accessed from stored or archived audio and video signals. Additionally, the communication system 10 may be configured such that the receiver unit 65 may receive audio and video signals at locations other than at an event (e.g., at a stadium event), such as, for example, at a home in connection with satellite television broadcasting. Further, conditional access may be provided such that, for example, only authorized receiver units 65 (e.g., receiver units 65 having authorized serial numbers) can receive the audio and video signals (e.g., encrypted audio and video signals).

It should be noted that various embodiments of the present invention also allow users with, for example, portable devices, and more particularly, wireless portable devices to receive video and audio content from a plurality of sources and to select at the portable wireless device the content that the user desires or needs to access. For example, a user may select from programming from different sources provided on a plurality of selectable channels. Using the various embodiments of the present invention, a transmission or broadcast system may provide a plurality of combined audio/video signals at an event for access by a user with a wireless portable device.

Thus, spectators at an event may be provided with a selection of audio and/or video event signals pertaining to other remote events and other non-event related content that may be of interest to the spectators. In particular, a plurality of different audio and/or video event signals are received from various locations and sources (e.g., remote locations, cable TV channels, Satellite TV channels, Satellite or Digital radio, VCR or DVD players). These different signals may be provided, for example, by the communication system 10 via one or more broadcast systems 32. For example, multiple audio event signals may be received from different events being provided via a Satellite Radio, and each audio event signal may define information, such as a play-by-play commentary pertaining to the event occurring at the stadium from which the audio event signal is generated or from another stadium.

Each of the audio and/or video event signals and each of the non-event remote signals may be received, monitored and then selected for broadcast by the broadcast system 32 at an event based on the relevance of the content, or by the particular desires and preferences of the event spectators that will be using portable receiving devices. For example, a determination may be made that spectators at a particular stadium are likely to be interested in particular ones of the audio event signals. In an exemplary embodiment, such audio event signals are then transmitted to the broadcast system 32 servicing the particular stadium. The broadcast system 32 then may broadcast the audio event signal to the spectators being serviced by the broadcast system 32. For example, a determination may be made that spectators at a first stadium for viewing a Southeastern Conference (SEC) football game are interested in other SEC football games occurring at other stadiums. In such a case, audio event signals defining the play-by-play commentary of the other SEC football games may be transmitted to the broadcast system 32 servicing the first stadium. The broadcast system 32 may then broadcast these audio event signals to the spectators at the first stadium.

For other stadiums, different sets of audio event signals may be received, monitored and selected for broadcast at the event. For example, for a stadium where a BIG 10 football game is occurring, a Satellite Radio system could be monitored for audio event signals pertaining to other BIG 10 football games. These audio event signals may then be selected for broadcast to the spectators of the stadium via the broadcast system 32. Further, and as another example, for a stadium where a Major League Baseball (MLB) game is occurring, audio and/or video event signals pertaining to other MLB baseball games being provided by a Cable TV system may be monitored and selected for broadcast by the broadcast system 32 servicing the stadium. Various combinations of audio and/or video event signals thereby may be provided to spectators at various stadiums and are not limited to the combinations described herein.

In addition to providing a user with live, non-event audio and/or video content from another sporting or entertainment event, other non-event related content can be monitored via a plurality of broadcast sources that are connected to the broadcast system 32 at the event. These other broadcast sources (e.g. Cable TV, Satellite TV, Satellite or Digital Radio, Local Broadcast TV or Radio) can be monitored for relevant non-event related content (e.g. news, weather, sports tickers and scores, movies, cartoons, advertisements, statistics and data) that can then be selected for broadcast at a specific event by the broadcast system 32 located at, for example, a stadium.

In an exemplary embodiment, when the broadcast system 32 receives audio and/or video event signals from various input sources, the broadcast system 32 may communicate such signals to spectators at the stadium serviced by the broadcast system. The communication of such signals may be wireless and/or non-wireless. For example, the broadcast system 32 may modulate each of the audio and/or video event signals on a carrier signal of a different frequency and wirelessly transmit the modulated signals to the stadium spectators. The stadium spectators may be provided with portable receiver units that demodulate and filter the audio and/or video event signals transmitted by the broadcast system 32. Specifically, using a receiver unit, a spectator may select one or more of the audio and/or video event signals received by the receiver unit, and the receiver unit may filter out all of the other audio and/or video event signals, thereby recovering the selected audio and/or video event signal or signals. The recovered audio and/or video event signal or signals may then be converted into sound via one or more speakers of the receiver unit or images via a display of the receiver unit.

It should be noted that a broadcast system 32 and, in particular, an antenna of the broadcast system may be located at or close to the stadium serviced by it. In such an embodiment, the audio and/or video event signals transmitted by the broadcast system 32 can be transmitted over a short distance (e.g., less than approximately one-half of a mile), thereby limiting various restrictions imposed by regulation agencies, such as the Federal Communication Commission (FCC). Various frequency ranges may be employed, for example, each broadcast system 32 in an exemplary embodiment may transmit audio and/or video event signals within the ultra-high frequency (UHF) range, microwave range (e.g., two to ten gigahertz range), etc.

Figure 5:
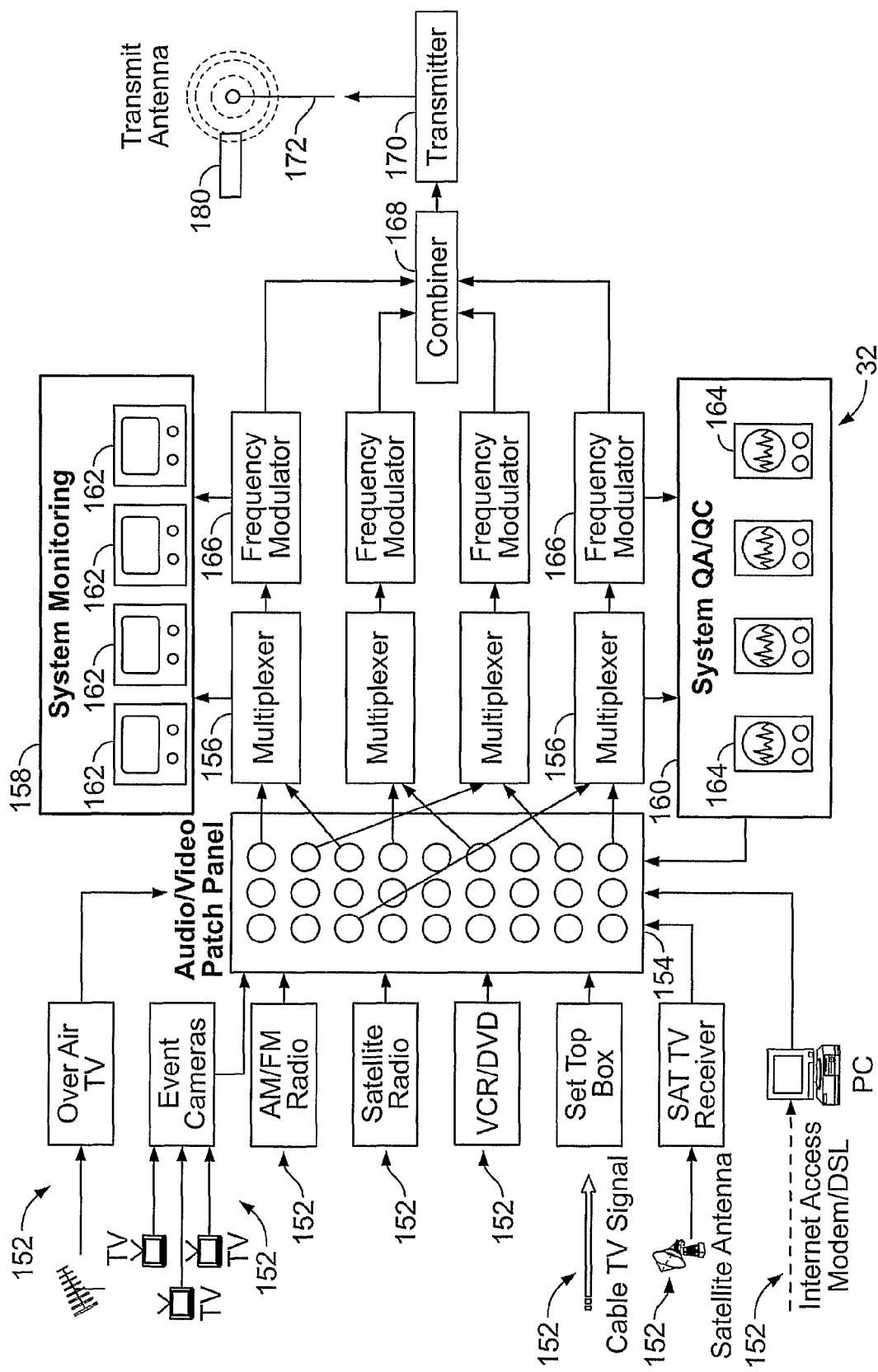
FIG. 5 is a block diagram of a local broadcast system in accordance with one exemplary embodiment of the present invention.

FIG. 5 illustrates an exemplary embodiment showing the various input sources for both event and non-event audio and/or video signals that are monitored and selected for broadcast by the broadcast system located at the event, also referred to herein as a local broadcast system. For illustrative purposes, the broadcast system will be described as enabling spectators attending NCAA football games at stadiums to select and hear a play-by-play commentary and/or see video images of various football games, as well as access other non-event content. However, it should be noted that, in other embodiments, the broadcast system may enable spectators to listen to and view other types of information pertaining to other types of events (e.g., football, auto racing, golf, horse racing, etc.) located at different venues (e.g., race track, open road race course, golf course, etc.) or other types of information (e.g., news or stock quotes).

FIG. 5 is a block diagram of a local broadcast system 32 of an exemplary embodiment of the present invention. The broadcast system 32 generally includes means for receiving audio and/or video signals (e.g., audio and/or video feeds and audio and/or video event signals, non-event content, recorded or archived content) from a plurality of sources 152 (e.g., local event and remote sources). The broadcast system 32 then may combine various audio and/or video signals as described herein for broadcast of a plurality of audio and/or video signals to receiver units 180 or receiver units 65 (shown in FIG. 3), which allow users attending events, for example, at various stadiums to select audio and or video signals from one or more sources. The audio and video signals define content for audio output or display with the receiver units. The sources may be located at the event at which the spectator is attending and providing audio and video signals pertaining to that event, or may be located remote from the event attended by the spectator, and provide audio and video signals pertaining to the remote event. Further, the sources may provide audio and video signals pertaining to other content, such as, for example, non-event content such as television programming.

In one exemplary embodiment, one or more spectators, for example, at the stadium, is provided with the receiver unit 180 capable of receiving and demodulating the signals transmitted by the broadcast system 32. The selected audio and/or video signals, such as play-by-play feeds, advertising, television programming, etc. are then output by the receiver unit 180 (e.g., output as audio from a speaker or video from a display), thereby reproducing, for example, the play-by-play commentary or video images defined by the selected feed(s). For example, assume that a spectator at Neyland Stadium, while watching a Tennessee game occurring at Neyland Stadium, is interested in the football game occurring at Griffin Stadium. In such an example, the spectator may tune his receiver unit 180 (e.g., select a channel) such that the receiver unit filters out all play-by-play feeds except the feed originally generated at Griffin stadium. As a result, the receiver unit outputs the play-by-play commentary of the football game occurring at Griffin Stadium. Moreover, the spectator may listen to this commentary while watching the Tennessee football game or another game on the receiver unit 180. As another example, the spectator may tune the receiver unit 180 to receive a television feed or to access Internet content.

It also should be noted that it is not necessary for the system used to transmit signals, for example, to spectators at a particular stadium, to be located at or close to the particular stadium. However, locating the broadcast system at or close to the stadium may be desired or needed (e.g., results in less strenuous FCC restrictions). Further, it should be noted that any type of video and/or audio event and/or non-event signals may be processed by the broadcast system 32. For example, in addition to or instead of generating and providing a play-by-play audio signal of an event, a camera may generate a play-by-play video signal of the event or a satellite system may generate satellite television programming. This video content then may be routed to the broadcast system 32 at the event, which mixes the video signal with, for example, other audio and/or video signals from other events or non-event content or signal.

Specifically, the broadcast system 32 receives content in the form of audio and video signals from a plurality of sources 152. In one exemplary embodiment, the system may be a mobile broadcast system (e.g., within a broadcast van) that includes an interface 154, shown as an audio/video patch panel for receiving signals from each of the various sources. It should be noted that broadcast system 32 may be a fixed system or partially fixed (e.g., some of the components fixed at a stadium and other components within a mobile unit). A plurality of multiplexers 156 receive the signals from the interface 154. The multiplexers 156 combine the signals as described in more detail herein. Each of the multiplexers 156 outputs the combined signals to a monitoring system 158 and a quality control system 160. The monitoring system 158 may include a plurality of displays 162 (e.g., monitors with a broadcast van) for viewing, for example, by a program controller operating the broadcast system 32 for monitoring the content. The quality control system 160 may include a plurality of signal analyzers 164 or other components for measuring signal quality and maintaining a level of quality assurance/quality control (QA/QC). For example, one or more oscilloscopes, spectrum analyzers and/or video monitors may be provided for use onsite to ensure that the quality and strength of each multiplexed signal is within or satisfies a predetermined or predefined specification or level prior to be being combined and transmitted.

The outputs of the multiplexers 156, and in particular the multiplexed signals are provided to a plurality of frequency modulators 166 for modulating the plurality of multiplexed signals on different frequencies. The modulated signals are then provided to a combiner 168 for combining the signals and transmission via a transmitter 170 using, for example, an antenna 172. In various embodiments, the multiplexers 156, frequency modulators 166 and combiner 168 together may define, or be embodied in, one or more processors.

Thus, the broadcast system 32, after receiving a plurality of signals from a plurality of sources, modulates and transmits selected signals to, for example, spectators at the stadium having receiver units 180.

Figure 6:
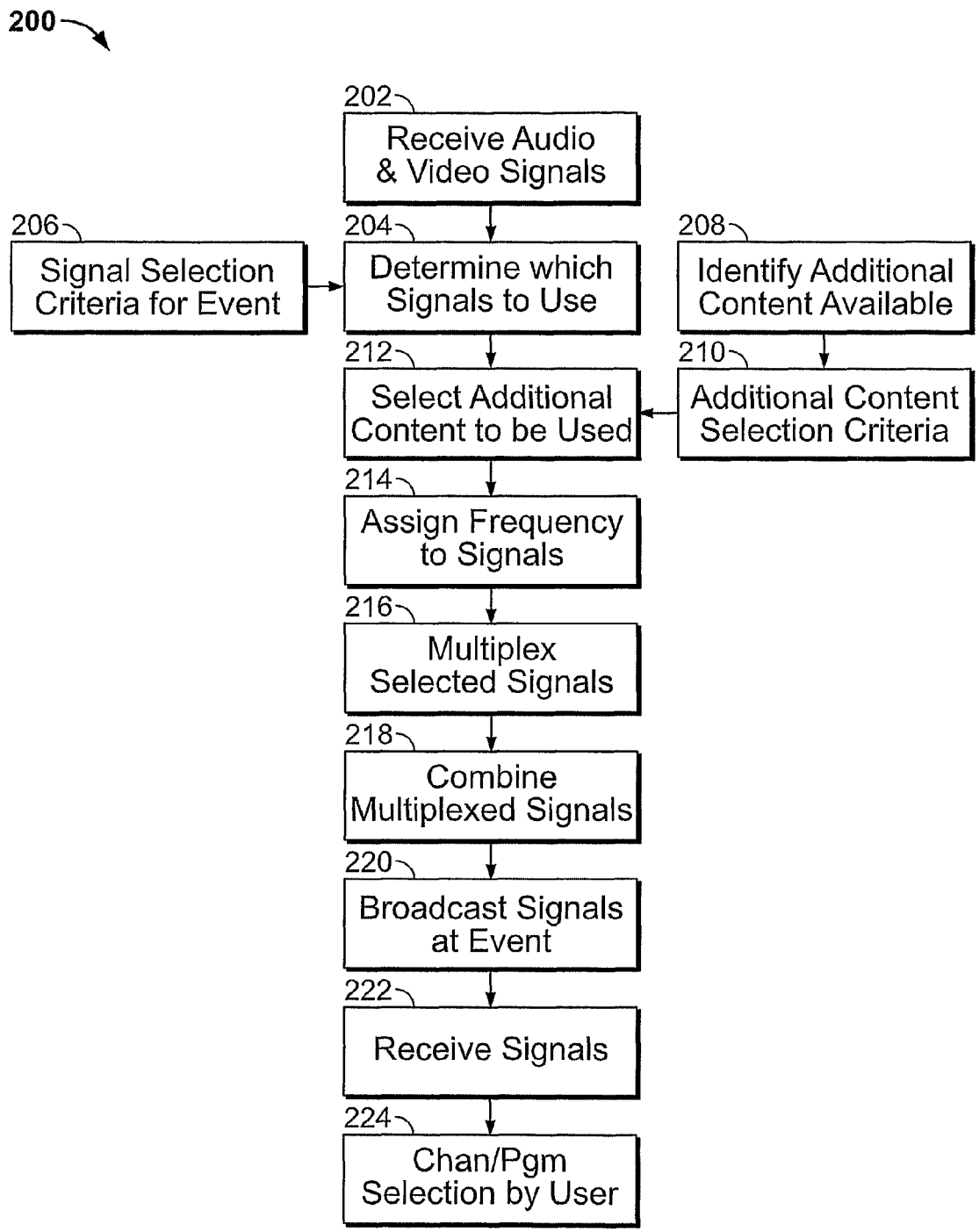
FIG. 6 is a flowchart of an exemplary process for accessing and broadcasting content from a plurality of sources at an event in accordance with an exemplary embodiment of the present invention.

FIG. 6 is a flowchart 200 illustrating exemplary processes utilized by the broadcast system 32. A plurality of audio and video signals are received from a plurality of sources at 202. This includes receiving audio and video signals defining content from, for example, both local and remote sources, such as Cable TV, Satellite TV, Satellite or Digital Radio, Over the Air TV or Radio, VCR or DVD Players, and generally defining event content and non-event content. A determination is then made at 204 as to which audio and video signals to use (i.e., event related content). This may include using signal selection criteria for an event at 206 to make a determination of which signals to use. This criteria may include, for example, spectator or regional preferences, information relating to the geographic location of the source of the signals (e.g., signals from stadiums within a particular geographic region or relating to teams in that region) and/or other predetermined criteria (e.g., type of game being played). It should be noted that the audio and video signals may be selected based upon other criteria, determinations or factors, such as, for example, time of day (e.g., events occurring at the same time), the type of event (e.g., all sports events, all football games, all baseball games, etc.) and/or variety (e.g., select signals to provide diverse programming). At 208 additional content (i.e., non-event related content) available for use is identified and at 210 selection criteria for determining which additional content to include is used to determine additional content to be included as part of the signals to be broadcast (e.g., news from an over the air source) at 212.

At 214 a transmission frequency is assigned to each of the signals and at 216 the signals are multiplexed. The multiplexed signals are combined at 218 and the combined signals are broadcast at the event at 220. The combined signals are received at 222 by portable devices at the event and at 224 a user may select particular content to be displayed and/or output as sound by the portable device.

Additionally, the various embodiments described herein are not limited for use in connection with particular systems or for receiving signals from specific sources, but may receive signals from other sources, such as, for example, the system for distributing audio and/or video signals described in U.S. Pat. No. 6,578,203, the entire disclosure of which is hereby incorporated by reference herein.

Figure 7:
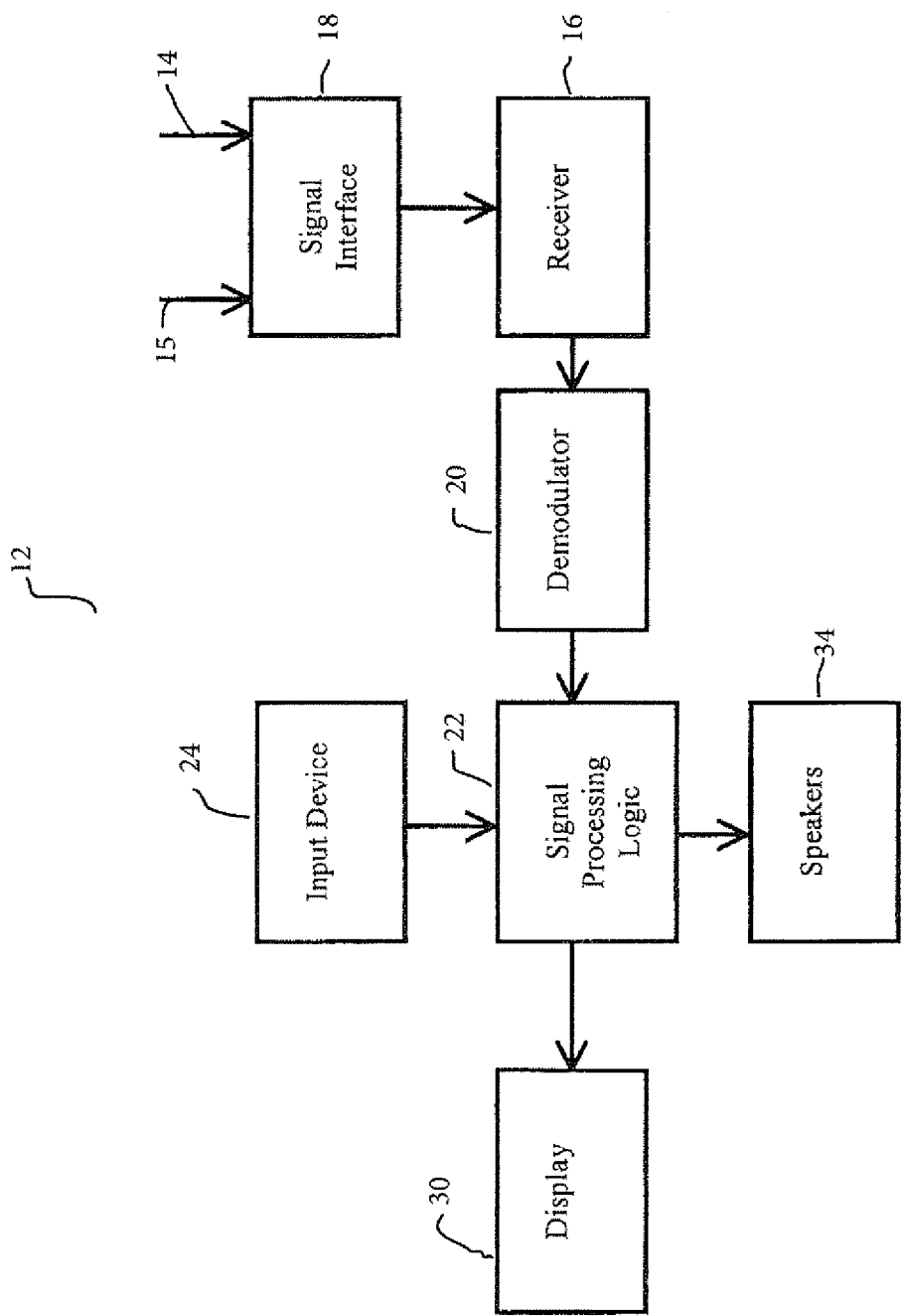
FIG. 7 is a block diagram of one exemplary embodiment of a video/audio receiving system constructed according to the principles of the present invention.

FIG. 7 illustrates an exemplary embodiment of a video/audio receiving system 712 constructed according to the principles of the present invention. At least one video signal 714 and at least one audio signal 715 are received by a receiver 716 via a signal interface 718. Each of the video signals 714 defines, for example, a view of an event, such as from different perspectives. For example, the video signals 714 may be generated by different video cameras located at different locations at an event (e.g., positioned at different locations around a stadium or racetrack, at various holes at a golf tournament, close-up to or on the stage at a concert). Furthermore, each of the audio signals 715 defines different sounds associated with an event. For example, at least one of the audio signals 715 may be generated from a microphone located close to the sideline of a game or in one of the helmets of one of the players of the game (e.g., the helmet of a football player) such that the audio signal defines sounds from the participants in the game, or may be generated from a microphone in a pit area of a racetrack with the audio signal defining sounds from the pit crew. Alternatively, at least one of the audio signals 715 may define the comments of television commentators, and at least one of the audio signals may define the comments of radio commentators. Further, and for example, the video signals 714 may define live television broadcasts of the event.

It should be noted that the video and audio signals 714 and 715 may be received from a plurality of different sources (e.g., local broadcast, closed circuit broadcast at the event, cable television, satellite broadcast and the Internet) and define content related to the event being attended or another event. It should also be noted that the video and audio signals 714 and 715 are not limited to providing images and sounds of one event or the event being attended. Event content defined by the video and audio signals 714 and 715 and/or other signals (e.g., data signals) may include, but is not limited to, audio/video from other events, public television broadcasts, cable television broadcasts, satellite broadcasts, Internet data, such as, for example, emails or news, and interactive media or data, such as, for example, trivia contests or other games.

In particular, at least one of the audio and one of the video signals may be transmitted as a single combined signal from an audio/video system such as described in U.S. Pat. No. 6,578,203 entitled "Audio/Video Signal Distribution System for Head Mounted Displays," the entire disclosure of which is hereby incorporated herein by reference. Additionally, one or more of the video and/or audio signals may be wireless, in which case, the signal interface 718 may include one or more antennas for receiving the wireless signals. However, various other types of signal interfaces 718 are contemplated. For example, the signal interface 718 may be a cable or other type of wired or signal transmission apparatus. Any type of wireless and/or non-wireless technique may be used to transmit signals to receiver 716 via the signal interface 718.

Some of the video and audio signals 714 and 715 may be unmodulated when transmitted to the receiver 716 through the signal interface 718 and, therefore, do not need to be demodulated by the system. However, some of the video signals 714 and/or audio signals 715 may be modulated when received by the receiver 716, and, therefore, may need to be demodulated by the system 712. For example, at least one of the audio signals 715 defining the comments of radio commentators may be modulated as a radio signal for transmission to radios located at or away from the event, and at least one of the video signals 714 may be modulated as a television signal for transmission to televisions located at or away from the event. Therefore, as shown in FIG. 7, the a video/audio receiving system 712 preferably includes a demodulator 720 configured to demodulate modulated video signals 714 and/or audio signals 715 received by the receiver 716 through the signal interface 718.

Once demodulated, if necessary, the video and audio signals 714 and 715 are processed by signal processing logic 722, which selects and conditions the signals 714 and 715. Specifically, the signal processing logic 722 selects, based on inputs from the user as described herein, one or more of the video signals 714 and one or more of the audio signals 715. It should be noted that the signal processing logic 722 may be implemented via hardware, software, or a combination thereof. Further, the signal processing logic 722 may include one or more filters for filtering out unselected signals 714 and 715. After selecting one of the video and audio signals 714 and 7107, the signal processing logic 722 conditions the selected video signals 714 such that they are compatible with an image display system 730, and the signal processing logic 722 conditions the selected audio signals 715 such that they are compatible with speakers 734. The signal processing logic 722 then transmits the conditioned audio signals 715 to the speakers 734, which converts the conditioned audio signals 715 into sound. The signal processing logic 722 also transmits the conditioned video signals 714 to the image display system 730, which displays the image defined by the conditioned video signals 714 according to techniques known in the art. It should be noted that the processing performed by the signal processing logic 722 may be provided as described in U.S. Pat. No. 6,578,203.

Further, an input device 724, which may include, for example, one or more buttons, knobs, dials, or other types of switches, may be used to provide the inputs for the processing performed by the signal processing logic 722. It should be noted that these exemplary input devices 724 may be interchanged, modified or replaced with other input devices as desired or needed. By controlling the components of the input device 724, the user may control various aspects of the processing performed by the signal processing logic 722, including which video signals 714 are selected for viewing, as well as which audio signals 715 are heard and the volume of the audio signals 715.

Figure 8:
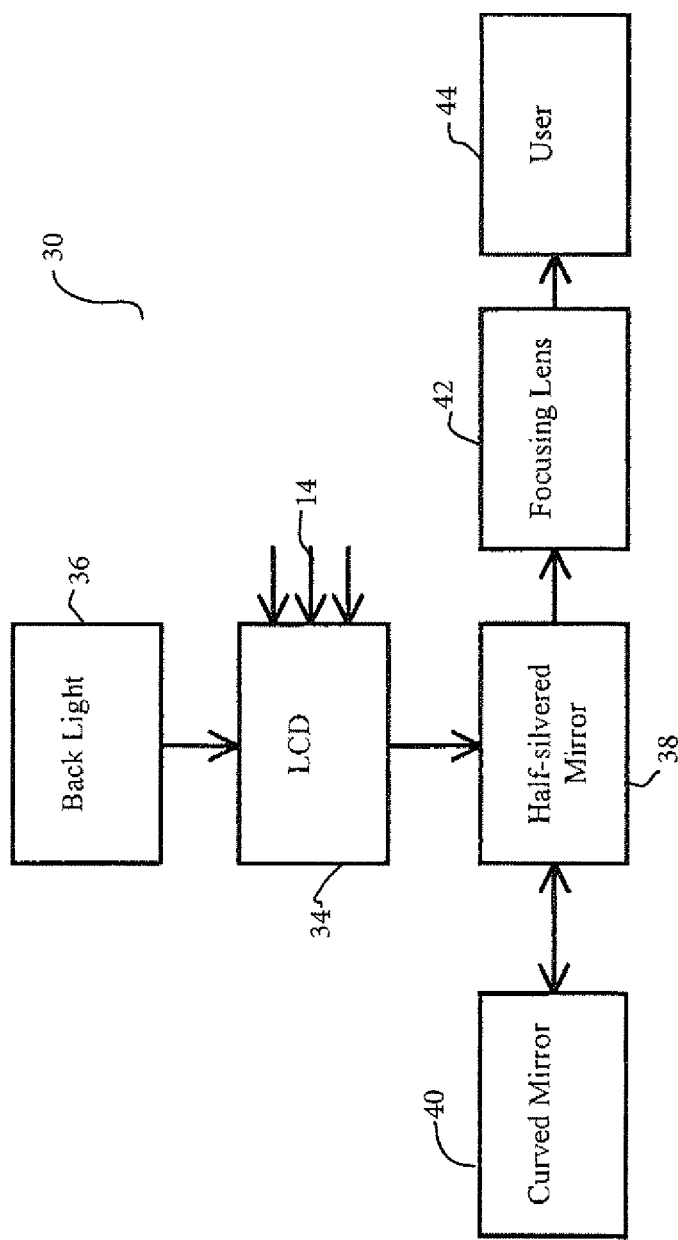
FIG. 8 is a block diagram of one exemplary embodiment of an image display system of FIG. 1.

FIG. 8 illustrates an exemplary embodiment of an image display system 730 constructed according to the principles of the present invention. Specifically, a processed video signal 714 is displayed onto a Liquid Crystal Display (LCD) 734. The LCD 734 may be lit from the back via a backlight 736, with the light shining through the LCD 734, creating an image on the other side of the LCD 734. On the opposite side of the LCD 734 from the backlight 736, a distance from the LCD 734, is a half-silvered mirror 738. The half-silvered mirror 738 is set at an approximately forty-five degree angle from the LCD 734. The image reflects off the half-silvered mirror 738 onto a separate curved mirror 740 set a distance away from the half-silvered mirror 738. The curved mirror 740 magnifies the image. The magnified image reflects off of the curved mirror 740, back to the half-silvered mirror 738. The magnified image passes through the half-silvered mirror 738 to a lens 742 located on the opposite side of the half-silvered mirror 738 from the curved mirror 740. The magnified image passes through the lens 7133, which focuses the magnified image.

Figure 9:
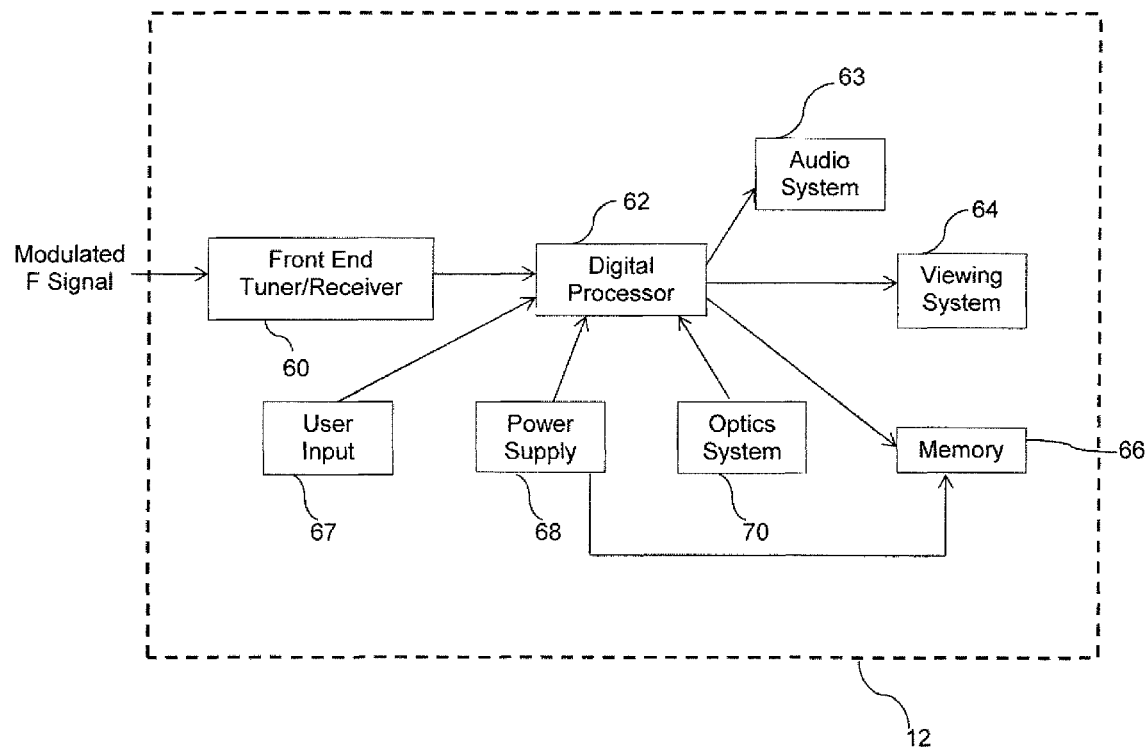
FIG. 9 is a block diagram of another exemplary embodiment of a video/audio receiving system constructed according to the principles of the present invention.

Other embodiments of a video/audio receiving system having additional or different components and performing additional or different functions are contemplated (e.g., enhanced viewing capabilities using binocular functions or video/audio storage capabilities). Specifically, in another exemplary embodiment, a video/audio receiving system 712' as shown in FIG. 9 includes a front end tuner/receiver 760 provided for receiving a signal (e.g., modulated RF signal from an antenna within a receiving device) containing video signals 714 and/or audio signals 7107, or a combination thereof. A processor, such as, for example, a digital processor 762 processes the received signal to provide video signals 714 defining images for display via a viewing system 764. The digital processor 762 may process the received signals to provide audio signals 715 defining audio for output by the handheld device via an audio system 763 (e.g., output using speakers or to headphone connected to an audio jack). In one embodiment, the video/audio receiving system 712' includes a memory 766 for storing video or audio content as described herein. A power supply 768 is also provided for powering the video/audio receiving system 712', and specifically the digital processor 762 and memory 766. The video/audio receiving system 712' also includes an optics system 770 for capturing images of an event, which are then processed by the digital processor 762 for display on the viewing system 764 or storage within the memory 766.

In particular, in one embodiment, the front end tuner/receiver 760 includes a digital video receiver/demodulator (i.e. tuner) that enables the video/audio receiving system 712' to receive both digital video and audio signals transmitted, for example, over standardized television, Wireless Fidelity (WiFi), or other RF frequency bands. It should be noted that the received broadcast signal provides live and recorded video and audio content, and may include processor serial number specific enabling codes to indicate whether a particular video/audio receiving system 712' is permitted to receive and display the broadcast signal (i.e. conditional access). Thus, conditional access allowing for both rental of devices containing the video/audio receiving system 712' and/or pay per view functionality when devices are owned by a user 44 may be provided.

The digital video/audio output of the front end tuner/receiver 760 is provided to the digital processor 762, wherein the received signals are processed (e.g., conditioned) for display on the viewing system 764 or for storing in the memory 766 for later access and display. The front end tuner/receiver 760 is configured to receive transmissions having different transmission requirements, such as, for example, from 8 Virtual Side Band (8VSB) commercial television broadcasts, Coded Orthogonal Frequency Division Multiplex (COFDM) commercial television broadcasts and/or locally transmitted event content, such as provided using the system described in U.S. Pat. No. 6,578,203. Further, the front end tuner/receiver 760 also provides received audio signals to the digital processor for processing and outputting processed digital audio outputs for listening by a user or for storage.

The digital processor 762 is configured for processing video and audio signals 714 and 715 from the front end tuner/receiver 760. Further, the memory 766 and the optics system 770 are configured such that processed video and audio signals 714 and 7107, which may include, for example, live view, real and recorded video and stored video and digital images, may be viewed using the viewing system 764 (e.g., via an LCD). The digital processor 762 interfaces directly with both the front end tuner/receiver 760 and the optics system 770 such that a user, via hardware and/or software controlled using a user input 767, can select the desired viewing or audio input. The user input 767, may include, for example, one or more buttons, knobs, dials, or other types of switches. It should be noted that these exemplary user inputs 767 may be interchanged, modified or replaced with other user inputs as desired or needed.

Additionally, the output of the digital processor 762, for example in the form of still images or continuous video, may be stored in the memory 766. The stored images/video may then be available, for example, for future viewing using the viewing system 764, or downloading to a printer or computer for further processing.

User control of the video/audio receiving system 712' to control the operation of the digital processor 762 may be provided by a user input 767 (e.g., a standard NSEW four position button) provided as part of a handheld device. The user input 767, such as, for example, a multi-function button select system allows the user to select the mode of operation (e.g., broadcast video, binocular, digital camera with various telephoto settings, record and playback), as well as other features specific to a particular mode. For example, this may include telephoto options, video record time, start, stop, and rewind; image store (e.g., take a picture); store a continuous view (e.g., camcorder recording), etc. Additionally, the user input buttons may be used to control other functions, such as, for example, volume and video channel selection.

In one exemplary embodiment, the optics system 770 includes two fixed focus lenses each providing a signal to a charge coupled device (CCD). The CCD converts the focused optical signal into a digital signal that is processed by the digital processor 762 for display using the viewing system 764. In operation, the two fixed focus lenses enable, for example, a wide field view and a telephoto view, depending on the selection made by a user via the user input 767. For example, the optical zoom allows for a higher resolution zoom capability than an electronic zoom, in which a portion of the signal received by the CCD is expanded or "blown-up" to provide zoom capability. Thus, by including two lens/CCD subsystems, both optical and electronic zoom capabilities may be provided that allows for different settings (e.g., wide field (optical), telephoto 1 (digital from the wide field lens), telephoto 2 (optical telephoto), and telephoto 3 (digital from the optical telephoto lens)).

Viewing system 764 receives processed signals from the digital processor 762 or processed signals stored in the memory 766, and using "near-to-the-eye" optics, provides a user with an image (e.g., video image) of the processed signals. Using known displays and associated optics, a video image is provided such that a user appears to be viewing an image that is much larger than actually displayed. It should be noted that the viewing system 764 displays the output of the digital processor 762 based upon any of the video/audio/optical input sources.

The memory 766 may be provided using permanent memory, removable memory (e.g., DRAM), or a combination of both, such that a user may store single images and/or continuous video. The stored images and/or continuous video may be, for example, reviewed or replayed at the event to ensure that the contents stored is what is desired or needed by the user or to allow a user to view part of the event again (e.g., view a close call in a football game). In one embodiment, removable memory may be provided, such as, for example, a memory stick/cartridge that may be removed by a user after use at the event. Other interfaces may also be provided to access the images and/or continuous videos stored in the memory 766, such as a USB connector allowing for the downloading of the stored memory (e.g., captured video) to a computer.

In one exemplary embodiment, the power supply 768 includes a rechargeable battery, such as a rechargeable Li Ion or Li Polymer battery that may be permanent or removable from a device for recharging. The power supply 768 may also include a recharge outlet for recharging a battery while still in the device using a standard AC/DC power converter. The power supply 768 may also include a smaller replaceable battery (e.g. NiCad battery), that provides constant power to the memory 766 to ensure that a user's settings are not lost when main battery power falls below a predetermined operating level.

In the various embodiments of the present invention, the video/audio receiving systems 712 and 712' are embodied within portable devices. Using handheld devices for viewing video signals 714, a user's viewing experience may be enhanced. For example, when using the handheld devices, a field view of the game from a camera located on another side of the stadium may be selected by a user, thereby allowing the user 44 to see a similar view as spectators located in that portion of the stadium. Further, in some embodiments, because the handheld devices may limit the user's peripheral view of the environment around him or her, the user 44 focuses on the view provided by the handheld devices. In these embodiments, when the user 44 desires to view the event (e.g., game) directly, the user may quickly lower the handheld device so that the user's view of the game is not obstructed. It should be noted that the handheld devices may enhance a user's experience at any event, such as, for example, any sporting event or other event where a user 44 is unable to view the entire event (e.g., unable to see the entire racetrack).

Furthermore, because the handheld devices are handheld, they are easily portable, and the user 44 may carry the handheld devices with him or her, and choose where he or she would like to view the images produced by the handheld devices. For example, the user 44 may walk throughout a stadium with the handheld device in hand while intermittently viewing the images and hearing the sounds produced by the video/audio receiving system 712 or 712'. Further, by manipulating user input 767, the user 44 may control which video signals 714 are displayed and which audio signals 715 are produced by the video/audio receiving systems 712 or 712'. Accordingly, the handheld devices provide the user 44 more flexibility to observe and listen to an event, such as a sporting event, and results in a more enjoyable experience.

Different types of materials (e.g., part molded and part flexible material), casings or housings for the handheld devices may be employed to implement the various embodiments of the present invention.

Thus, a user 44 may be provided with different video and audio content associated with an event at which the user is attending, another event of interest, or content of interest to the viewer (e.g., business news, cartoons, etc.). Further, a user 44 may select different options for viewing the event (e.g., binocular viewing) or store some or all of the event content (e.g., store still images of the event).

It is not necessary for the user 44 to keep the handheld device within the confines of the event (e.g., within the stadium). For example, the video and audio signals 714 and 715 may be transmitted via satellites and/or communication networks to various locations around the world, and the user 44 may select the view he or she prefers the most from a remote location capable of receiving a video signal 714 and/or audio signal 715.

The handheld device also may be retrieved from the user 44 after the user 44 is finished viewing the event so that the handheld device can be provided to another spectator for another event, for example, at another stadium. Each user 44 may be charged a usage fee for use of the handheld device, or alternatively, a user may purchase the handheld device and pay a monthly subscription fee for use of the device. In some of the various embodiments, payment of the fee may be required before the user 44 is provided with the handheld device. In other embodiments, the handheld device may receive information, via video and audio signals 714 and 7107, or otherwise, indicating whether the handheld device is authorized to produce sounds and images defined by the signals (e.g., authorized serial number transmitted to the video/audio system 712 or 712'). In this embodiment, the handheld device is configured to produce images and sound only when authorized, with authorization information (e.g., authorization code unique to a handheld device) transmitted from an audio/video transmitter using an audio/video system such as described in U.S. Pat. No. 6,578,203, to the handheld device, only when the user 44 of the handheld device has provided proper payment.

It should also be noted that various modifications and changes may be made to the various embodiments of the present invention. For example, the signal interface 718 and front end tuner/receiver 760 may be constructed using wireless fidelity WiFi hardware and software for receiving transmission of content provided on different bands (e.g., 2.4 GHz, 5.8 GHz, or 10 GHz), instead of or in addition to a UHF TV frequency band (e.g., 400 MHz-800 MHz). Thus, the handheld device may operate and receive content via lower UHF frequency bands or higher WiFi bands as desired or needed.

Further, use of WiFi also allows for passive and active two-way communication. For example, in operation using passive communication, automatic "device to device" communication is transparent to a user 44. This communication may include, for example, communication of conditional access codes, collection of statistical data regarding viewing habits, etc. With respect to using active communication, interactive communication may be provided in which the user 44 actively makes requests for information, purchases, etc., which requests are conveyed to the system for further action. This also may include, for example, accessing the Internet or email. Thus, different types of data embodied in different signals, instead of or in addition to the video and audio signals 714 and 7107, may be implemented within the various embodiments of the present invention (e.g., transmitted and received by the handheld device).

Further, it should be noted that using the video/audio system 712 or 712' in connection with the handheld devices allows for operation of a venue based transmission system in which signals from a production facility not located at the event may be provided. For example, the signals, such as the video and audio signals 714 and 7107, may be available via the Internet or satellite with a transmission system operated and monitored remotely from the production facility. Further, and for example, at least one of the video signals 714 and one of the audio signals 715 may be transmitted as a single combined signal from an audio/video system such as described in U.S. Pat. No. 6,578,203 and that is provided at a production facility not located at the event. Thereafter, transmission is provided via multiple WiFi nodes at the event. The production facility may receive its content via satellite download.

Further, the portable device, including the portable receiver unit 65 or 180, may be any device having a receiver configured to receive signals from the various embodiments of the present invention described herein. For example, the wireless portable device may be any suitable device capable of displaying images or outputting sounds based on signals transmitted from the system 50. These devices include, but are not limited to, laptop computers, electronic tablet devices, cellular telephones, personal digital assistants (PDAs) and/or other handheld portable devices having wireless capabilities. Further examples of these devices, include, but are not limited to, the device described in co-pending U.S. application entitled "Electronic Handheld Audio/Video Receiver and Listening/Viewing Device" filed on Apr. 18, 2001 and having Ser. No. 09/837,128, the entire disclosure of which is hereby incorporated by reference herein; the device described in co-pending U.S. application "Audio/Video System and Method Utilizing a Head Mounted Apparatus with Noise Attenuation" filed on Aug. 31, 1999 and having Ser. No. 09/386,613, the entire disclosure of which is hereby incorporated by reference herein; and the device described in co-pending U.S. application entitled "Electronic Handheld Audio/Video Receiver and Listening/Viewing Device" filed on Jul. 30, 2003 and having Ser. No. 10/630,069, the entire disclosure of which is hereby incorporated by reference herein.

Thus, in operation, various embodiments of the present invention allow a user at an event to select and view and/or listen to event content or non-event content from a plurality of sources. The plurality of sources may be located locally at the event or remote from the event.

It should be noted that the component parts of the various embodiments may be modified as desired or needed. For example, the interface may be modified to accommodate signals from additional or different sources.

While the invention has been described in terms of various specific embodiments, those skilled in the art will recognize that the invention can be practiced with modification.

What is claimed is:

1. A system for providing entertainment event content to a portable device, the system configured to communicate with at least one facility that receives video signals defining event content associated with multiple entertainment events of a similar type, the system comprising:
   multiple antenna located to service different coverage areas that are located remotely from one another;
   a control unit configured to receive an input indicative of a viewing preference of a first user, the first user located in a first coverage area of a first antenna from the multiple antenna, the viewing preference indicating that the user desires to access a remote entertainment event, the remote entertainment event being remote from the first user and the first coverage area;
   the control unit configured to designate the first antenna to receive the video signal associated with the remote entertainment event indicated by the viewing preference; and
   a router capable of routing a first video signal, associated with the remote entertainment event, to the first antenna;
   the first antenna configured to wirelessly transmit first video signal to at least a first portable device within a corresponding first coverage area, the first video signal configured to allow the user to view the event content on the first portable device; and
   an access control unit configured to provide conditional access to the video signals such that only authorized portable devices are permitted to display the video event content.

2. The system of claim 1, wherein the router routes first video event content to at least a first antenna and second video event content to at least a second antenna, the first and second antenna defining WiFi nodes at a first entertainment event.

3. The system of claim 1, wherein one of the corresponding coverage areas include a stadium where a first entertainment event occurs.

4. The system of claim 1, wherein the first antenna is located proximate to a stadium where a local entertainment event is occurring and a second antenna is located remote from the local entertainment event, the first and second antenna transmitting local event content.

5. The system of claim 1, wherein sources comprise at least one of over air television, event cameras, AM/FM radio, satellite, VCR/DVD, cable television, satellite television, and Internet.

6. The system of claim 1, wherein the control unit is configured to designate antenna of a cellular network to receive the video signal.

7. The system of claim 1, wherein the control unit is configured to designate a plurality of the antenna to receive the video signal.

8. The system of claim 1, further comprising a modulator configured to modulate multiple video signals on different channels.

9. The system of claim 1, wherein the first portable device represents a cellular phone and the first antenna communicates with the cellular phone.

10. The system of claim 1, wherein the control unit designates that each of multiple antenna are to receive the video signal.

11. The system of claim 1, wherein the control unit determines a type of communication link to be used to transmit the video signal.

12. The system of claim 1, wherein a first antenna is located proximate to a stadium where a local entertainment event is occurring and a second antenna is located remote from the local entertainment event, the first and second antenna transmitting local event content.

13. The system of claim 1, wherein the control unit receives a request from the first portable device regarding which event content the user desires to watch.

14. The system of claim 1, wherein the control unit determines a type of communication link to be used to transmit the video signal.

15. The system of claim 1, wherein at least a portion of the antenna are configured to service coverage areas remote from the entertainment event and are configured to wirelessly transmit the video signal to cellular telephones while at locations other than at the entertainment event.

16. The system of claim 1, wherein the at least one antenna is configured to service a coverage area at a first entertainment event and the at least one antenna is configured to support active two-way communication with the first portable device through which the user actively makes a request for the video signal from the system.

17. The system of claim 1, wherein the video signal includes real-time video event content from a live entertainment event and recorded video event content from a prior entertainment event, where the live and prior entertainment events are a same type of event.

18. The system of claim 1, wherein the antenna and first portable device communicate through WiFi communications.

19. The system of claim 1, where the first antenna defines a WiFi node with the corresponding coverage area at a first entertainment event, the video signal including the event content associated with the first entertainment event.

20. The system of claim 1, wherein the control unit is configured to receive a user request for user specified event content, the router routing the video signal to the user in response to the user specified event content.

21. A method for routing entertainment event content to a portable device from a system that receives video signals defining event content associated with multiple entertainment events of a similar type, the method comprising:
  connecting to multiple antenna located to service different coverage areas that are located remotely from one another;
  receiving an input indicative of a viewing preference of a first user located in a first coverage area of a first antenna from the multiple antenna, the viewing preference indicating that the user desires to access a remote entertainment event, the remote entertainment event occurring at a location that is remote from the first user and the first coverage area;
  designating the first antenna to receive the video signal associated with the remote entertainment event indicated by the viewing preference; and
  routing a first video signal, associated with the remote entertainment event, to the first antenna;
  providing conditional access to the video signal such that only authorized portable devices are permitted to display the event content;
  wirelessly transmitting, from the first antenna, the video signal to at least a first portable device within the coverage area of the first antenna; and
  configuring the video signal to allow a user of the first portable device to view the event content on the first portable device.

22. The method of claim 21, wherein the routing includes routing first video event content to at least the first antenna and routing second video event content to at least a second antenna.

23. The method of claim 21, wherein the antenna are located to service corresponding coverage areas within a stadium where a first entertainment event occurs.

24. The method of claim 21, further comprising wirelessly transmitting a first video signal to a first portable device in response to a user request.

25. The method of claim 21, wherein at least a portion of the antenna are configured to service coverage areas remote from the entertainment event and are configured to wirelessly transmit the video signal to cellular telephones while at locations other than at the entertainment event.

26. The method of claim 21, wherein at least one antenna is configured to service a coverage area at a first entertainment event and the at least one antenna is configured to support active two-way communication with the first portable device through which the user actively makes a request for the video signal from the system.

27. The method of claim 21, wherein the video signal includes video event content from a first video source at a live entertainment event and audio event content from a first audio source at the live entertainment event.

28. The method of claim 21, wherein the antenna and first portable device communicate through WiFi communications.

29. The method of claim 21, wherein the first antenna defines a WiFi node with the corresponding coverage area at a first entertainment event, the video signal including the event content associated with the first entertainment event.

30. The method of claim 21, further comprising receiving a user request for user specified event content and routing the video signal to the user in responses to the user specified event content.

31. A system for providing entertainment event content to a portable device, the system comprising:
  inputs configured to receive video signals defining event content associated with multiple entertainment events of a similar type;
  a processor configured to receive inputs indicative of viewing preferences of users indicating which of the remote entertainments the users desire to view;
  multiple antenna located to service different coverage areas that are located remotely from one another, the multiple antenna including at least a first antenna configured to wirelessly transmit a first video signal to at least a first portable device within a corresponding coverage area for a first user to view the corresponding event content on the first portable device;
  an access control unit configured to provide conditional access to the video signal such that only authorized portable devices are permitted to display the video event content;
  a control unit configured to designate which of the multiple antenna represents the first antenna to receive the first video signal; and
  a router capable of routing the first video signal to the first antenna that was designated to receive the first video signal.

32. The system of claim 31, wherein the antenna are configured to wirelessly transmit the video signal to cellular telephones while at locations other than at an entertainment event.

33. The system of claim 31, wherein the antenna are configured to wirelessly transmit the video signal to portable devices while at home.

34. The system of claim 31, wherein the antenna wirelessly transmit real-time video event content from a live entertainment event and recorded event content from a prerecorded prior entertainment event.

35. The system of claim 31, wherein the control unit receives a request from the first portable device regarding which event content the user desires to watch.

36. The system of claim 31, wherein the inputs receive the event content associated with a plurality of entertainment events.

37. The system of claim 31, further comprising logic configured to generate first and second video signals, the first video signal including video event content from a live entertainment event, the second channel and second video signal including stored video event content from at least one prerecorded entertainment event.

38. The system of claim 31, wherein the first antenna is located proximate to a stadium where a local entertainment event is occurring and a second antenna is located remote from the local entertainment event, the first and second antenna transmitting local event content.

39. The system of claim 31, wherein the video event content is from at least one of over air television, event cameras, AM/FM radio, satellite, VCR/DVD, cable television, satellite television, and Internet.

40. The system of claim 31, further comprising a mixer configured to select signals to combine based on signal selection criteria, the signal selection criteria based on at least one of (i) spectator or regional preferences, (ii) a geographic location of a source of the signals, (iii) predetermined criteria, (iv) time of day, (v) type of event and (vi) content variety.

41. The system of claim 31, further comprising content insertion control logic configured to insert, into the video signal, non-event content including at least one of advertisements and commercials.

42. The system of claim 31, wherein the first portable device represents a cellular phone and antenna represent a cellular telecommunications network.

43. The system of claim 31, wherein the video signal includes scores and statistics.

44. The system of claim 31, further comprising logic configured to include, in the video signal, video event content from a live entertainment event and stored video event content from at least one prerecorded entertainment event.

45. The system of claim 31, wherein the mixer is configured to include, in the video signal, video event content from a live entertainment event and stored video event content from at least one prerecorded entertainment event, 46. A method for providing entertainment event content to a portable device, the method comprising:
   receiving video signals defining video event content associated with multiple entertainment events of a similar type;
   receiving inputs indicative of viewing preferences of users indicating which of the remote entertainments the users desire to view;
   connecting to a system having multiple antenna located to service different coverage areas that are located remotely from one another;
   providing conditional access to the video signal such that only authorized portable devices are permitted to display the video event content;
   designating which of the antenna are to receive the video signals based on the viewing preferences;
   routing the video signals to one or more of the corresponding antenna that are designated to receive the video signals; and
   wirelessly transmitting, from the designated antenna, a first video signal to at least a first portable device.

47. The method of claim 46, wherein at least a portion of the antenna are configured to service coverage areas remote from the entertainment event and are configured to wirelessly transmit the combined signal to cellular telephones while at locations other than at the entertainment event.

48. The method of claim 46, wherein at least one antenna is configured to service a coverage area at a first entertainment event and the at least one antenna is configured to support active two-way communication with the first portable device through which the user actively makes a request for the video signal from the system.

49. The method of claim 46, wherein the video signal includes real-time video event content from a live entertainment event and recorded video event content from a prior entertainment event, where the live and prior entertainment events are a same type of event.

50. The method of claim 46, wherein the antenna and first portable device communicate through WIFi communications.

51. The method of claim 46, further comprising categorizing the video event content based upon one of a geographic location of the corresponding entertainment event and a type of the entertainment event.

52. The method of claim 46, wherein one of the coverage areas includes a stadium where a first entertainment event occurs.

53. The method of claim 46, wherein the processing operation to generate the video signal comprises:
   generating a first channel, carrying video event content from a live entertainment event; and
   generating a second channel, carrying video event content from at least one prerecorded entertainment event.

54. The method of claim 46, further comprising receiving the video event content from a plurality of entertainment events.

55. The method of claim 46, further comprising selecting recorded video event content from a prerecorded prior entertainment event to include in the video signal.

56. The method of claim 46, wherein the processing comprises selecting video signals based on signal selection criteria including at least one of (i) spectator or regional preferences, (ii) a geographic location of a source of the signals, (iii) predetermined criteria, (iv) time of day, (v) type of event and (vi) content variety.

57. The method of claim 46, wherein the connecting includes utilizing a high speed communications link to convey the at least one video signal to the antenna.

58. The method of claim 46, wherein the portable devices represent cellular phones and the antenna represent a cellular or telecommunications network.

59. The method of claim 46, wherein the portable devices represent cellular phones and the antenna communicate with the cellular phones.

60. The method of claim 46, wherein a control logic designates that each of multiple antenna are to receive the video signal.

61. The method of claim 46, further comprising determining a type of communication link to be used to transmit the video signal.

62. The method of claim 46, wherein the video signal includes scores and statistics.

63. The method of claim 46, further comprising logic configured to include, in the video signal, video event content from a live entertainment event and stored video event content from at least one prerecorded entertainment event.

64. The method of claim 46, wherein a mixer is configured to include, in the video signal, video event content from a live entertainment event and stored video event content from at least one prerecorded entertainment event.

\* \* \* \* \*